United States Patent
Hofbauer

(10) Patent No.: US 8,337,359 B2
(45) Date of Patent: Dec. 25, 2012

(54) HYBRID ENGINE SYSTEM

(75) Inventor: Peter Hofbauer, West Bloomfield, MI (US)

(73) Assignee: EcoMotors International, Allen Park, MI (US)

(*) Notice: Subject to any disclaimer, the term of this patent is extended or adjusted under 35 U.S.C. 154(b) by 571 days.

(21) Appl. No.: 12/583,881

(22) Filed: Aug. 27, 2009

(65) Prior Publication Data

US 2010/0056327 A1 Mar. 4, 2010

Related U.S. Application Data

(60) Provisional application No. 61/190,312, filed on Aug. 27, 2008, provisional application No. 61/201,884, filed on Dec. 15, 2008.

(51) Int. Cl.
- B60W 10/02 (2006.01)
- B60W 10/08 (2006.01)
- B60W 10/04 (2006.01)
- F16H 37/06 (2006.01)
- B60K 6/20 (2007.10)
- B60K 6/42 (2007.10)

(52) U.S. Cl. .... 477/5; 477/6; 477/8; 74/661; 180/65.21; 180/65.22; 903/912; 903/914

(58) Field of Classification Search ............ 477/5, 6, 477/3, 8; 180/65.1–65.31, 65.6, 65.7; 74/661; 475/1–5; 903/912, 914

See application file for complete search history.

(56) References Cited

U.S. PATENT DOCUMENTS

| | | | |
|---|---|---|---|
| 3,194,087 A | 7/1965 | Kronogard | |
| 4,027,485 A * | 6/1977 | Wallis | 60/709 |
| 4,116,006 A | 9/1978 | Wallis | |
| 4,533,011 A | 8/1985 | Heidemeyer et al. | |
| 5,492,189 A | 2/1996 | Kriegler et al. | |
| 5,495,912 A | 3/1996 | Gray et al. | |
| 5,845,731 A * | 12/1998 | Buglione et al. | 180/65.23 |
| 6,170,443 B1 | 1/2001 | Hofbauer | |
| 6,278,194 B1 * | 8/2001 | Nakagawa et al. | 290/31 |
| 6,306,056 B1 | 10/2001 | Moore | |
| 6,668,953 B1 * | 12/2003 | Reik et al. | 180/53.8 |
| 7,317,259 B2 * | 1/2008 | Yamauchi | 290/40 C |
| 7,647,994 B1 * | 1/2010 | Belloso | 180/65.31 |
| 7,792,626 B2 * | 9/2010 | Eriksson et al. | 701/102 |
| 2002/0117860 A1 | 8/2002 | Man et al. | |
| 2003/0037978 A1 | 2/2003 | Hofbauer | |
| 2003/0104899 A1 | 6/2003 | Keller | |
| 2005/0189894 A1 | 9/2005 | Komiyama et al. | |
| 2008/0085814 A1* | 4/2008 | Yang | 477/5 |
| 2008/0173486 A1 | 7/2008 | Hsu | |
| 2008/0185198 A1 | 8/2008 | Jones | |
| 2008/0288192 A1 | 11/2008 | Kumar et al. | |

FOREIGN PATENT DOCUMENTS

| | | | |
|---|---|---|---|
| EP | 1731346 A1 * | 12/2006 | |
| WO | 9527326 A1 | 10/1995 | |
| WO | 2008077346 A1 | 7/2008 | |

* cited by examiner

*Primary Examiner* — Tisha Lewis
(74) *Attorney, Agent, or Firm* — Diana D. Brehob

(57) ABSTRACT

A hybrid engine and coupling system for use with a vehicle or other load which employs a motor/generator unit connected through controllable couplers to a kinetic energy storage device and to one or more internal combustion engine modules in a programmed manner. Several embodiments provide varying configurations to satisfy various power and packaging design requirements.

21 Claims, 27 Drawing Sheets

| Battery >75% full | Pre-Start | Start | Take off | GP 0 Gliding | GP 1 Electric | GP 2 opoc1 | GP 3 opoc 1+2 | BP 0 Gliding | BP 1 Electric | BP 2 Brake |
|---|---|---|---|---|---|---|---|---|---|---|
| ECC-GA | | | closed | closed | closed | | closed | closed | closed | closed |
| E-M/G | | | on | off | on | on, controlled with opoc1 | on | off | on | on |
| ECC1 | | | open | open | open | closed | closed | open | open | closed |
| opoc1 | | | on | off | off | on, controlled with E-M | on | off | off | on |
| ECC2 | | | open | open | open | open | closed | open | open | closed |
| opoc2 | | | off | off | off | off | on | off | off | on |

Fig. 15

| Battery < 30% full | Pre-Engine-Start | opoc1 Start | Take off | GP 0 Gliding | GP 1 Electric | GP 2 opoc 1 | GP 3 opoc 1+2 | BP 0 Gliding | BP 1 Electric | BP 2 Brake |
|---|---|---|---|---|---|---|---|---|---|---|
| ECC-GA | open | open | closes controlled | closed | | closed | closed | closed | closed | closed |
| E-M/G | E-Motor accelerates Flywheel to 1000 rpm | on | on | off | | on, controlled with opoc1 | on | off | on | on |
| ECC1 | open | closes controlled | closed | open | | closed | closed | open | open | closed |
| opoc1 | off | Puls-Start | on | off | | on + Recharges the Battery | on | off | off | on |
| ECC2 | open | open | open | open | | open | closed | open | open | closed |
| opoc2 | off | off | off | off | | off | on | off | off | on |

Fig. 16

HYBRID ENGINE SYSTEM

RELATED APPLICATIONS

This application claims benefit of provisional applications Ser. No. 61/190,312 filed Aug. 27, 2008 and Ser. No. 61/201,884 and filed on Dec. 15, 2008

TECHNICAL FIELD

This invention is related to the field of internal combustion engines and more specifically to a hybrid vehicle drive system that utilizes at least two prime mover modules and an alternative drive power source.

BACKGROUND

Conventional hybrid engine systems used for vehicle power plants rely on a single engine that is interconnected with a motor/generator. While significant fuel efficiencies are achieved using such combinations, there is room for improvement in terms of mileage efficiencies and emission reductions.

Recent configurations in hybrid systems have also included a plurality of IC engines of various power capacities in combination with a motor/generator and transmission to power a vehicle. In U.S. Pat. No. 6,722,458, for instance, IC engines having different power capacities are shown to be switchably connected in parallel to drive a transmission, while a motor/generator is separately connectable to a separate axle for either assisting the power drive to the vehicle or for generating electricity.

The 2-cycle engine described in U.S. Pat. No. 6,170,443 entitled "Internal combustion engine with a single crankshaft and having opposed cylinders and opposed pistons" ("OPOC engine") and incorporated herein by reference, has been demonstrated to offer significant improvements in both fuel efficiency and emissions when employed as a prime mover in vehicles and in stationary applications.

SUMMARY OF THE INVENTION

The charge depletion hybrid system of the present inventive concept provides for relatively more efficient power transfer from available power sources, as well as mechanical and control simplicity. An internal combustion engine ("ICE") and electric motor (EM) drive the vehicle in tandem. Therefore, the size of the ICE can be greatly reduced in comparison to the engine used to conventionally power a vehicle. This reduction is possible because the ICE used in the hybrid system is sized to meet steady state highway loads, and the EM is provided for low speed driving and to assist the ICE in tandem during transient conditions. Reducing the engine size allows the engine to operate at higher average thermal efficiency and within its ideal operating region, and thereby increasing fuel efficiency.

The present inventive concept expands the tandem hybrid concept by splitting the ICE drive into two separate engine modules: a primary engine for maximum efficiency and a secondary engine for maximum power and acceleration. In addition, the EM is an electrical Starter Motor/Generator ("E-M/G") that is used as a low speed power source alone or combined with the output of the primary ICE, or also with both the primary and secondary engines, as necessary, to provide supplemental power. Of course the E-M/G also serves to function in a generator mode to provide electrical energy to recharge the batteries and for braking assist.

The disclosed embodiments utilize a primary ICE module that is appropriately configured to supply average driving power which covers the majority of expected driving conditions and light to moderate acceleration. The secondary ICE module is a more powerful configuration to boost powertrain torque when required.

The inventive subject matter provides several improvements to hybrid engine technology by employing a plurality of separate (primary and secondary) prime mover engine modules that can be separately brought on-line in tandem, as needed, and in various combinations with an electric motor/generator to supply drive power to a vehicle transmission or other load.

Control scenarios for switching among the plurality of engine modules and the electric motor are disclosed which are based on gas pedal torque requested, pedal acceleration and coasting.

Control scenarios concerning regenerative and direct braking are based on brake pedal force and movement.

The inventive subject matter may be seen as suitable as either an original prime mover for a vehicle designed to take advantage of the efficiencies offered, or as a "drop-in" substitute hybrid power plant for a conventional internal combustion engine to drive a conventional transmission in a vehicle and therefore provide a low cost conversion.

When the inventive subject matter is combined in a vehicle with other low friction technologies, such as low drag brakes, low rolling resistance tires, and/or coasting transmissions, significant increases in overall fuel efficiency can be realized.

The inventive subject matter's use of OPOC engine technology in the disclosed embodiments as a hybrid power plant allows other significant improvements in vehicle fuel efficiencies to be realized due to: the low weight of this type of engine (up to 25% weight reduction over conventional engines); its low profile shape (allowing better aerodynamic body design); and its adaptability to burn diesel fuel, as well as gasoline and other fuels with low emissions.

Other engine or prime mover sources can be substituted for OPOC engine technology when desired and within the concept of the inventive subject matter. For instance, turbines, fuel cells, pneumatic motors (compressed gas) hydraulic pumps, individual 2 or 4 cycle IC engines or combinations thereof, and additional electric motors connected to electric storage devices, can be used as modules that are separately brought on-line to supplement the initial electrical drive system.

It is an object of the present invention to provide a coupling system for power transfer between powerable modules and an integrator. A coupler is selectably couplable with at least two powerable modules. The coupler comprises at least two receivers, with each receiver linked to a moving element of a separately powerable module. The integrator is engagable with the at least one receiver so that the total power transfer output by the coupling system is derived from a sum of power input to the integrator via one or more of the receivers engaged with the integrator. A controller switches the engagement of the integrator with one or more receivers according to a selected power profile defining which powerable modules are to be engaged through the coupling system with the integrator.

It is another object of the present invention to provide a hybrid engine for an automotive vehicle that includes: a motor/generator unit; a primary engine module; a secondary engine module; a kinetic energy storage device; a first controllable coupler activated to connect the motor/generator unit to the kinetic energy storage device; a second controllable coupler activated to connect the primary engine module to the kinetic energy storage device; a third controllable coupler activated to connect the secondary engine module to the kinetic energy storage device; a power take-off connectable to the kinetic storage device for providing rotational torque forces from the kinetic storage device to a load; a fourth controllable coupler activated to connect the kinetic energy storage device to the load through the power take-off; and a controller programmed to react to various predetermined inputs for activating or deactivating the couplers during the operation of the vehicle.

It is a further object of the present inventive concept to provide a hybrid engine system that is programmable to vary its operational determination profile in accordance with a plurality of input parameters. Parameters such as external air temperature, oxygen level, mass air measurements, altitude, weight of load in vehicle, speed of vehicle, temperatures of engine modules, speeds of engine modules, speed of flywheel, temperature of flywheel, road conditions (uphill, downhill, flat, rough, smooth, etc.), fuel energy properties, driver selection of high fuel efficiency or performance, and battery charge, may be used for these operational determinations. Also, GPS or cell tower triangulation location information may be utilized by the controller in order to anticipate changes in altitude, road conditions or road characteristics. Data gathered, as part of vehicle uplinks from the experiences of other vehicles traveling over the same locations, may be stored and then considered by the controller when the vehicle approaches that location in order to determine the best and most efficient operation profile for the system in the controlled vehicle. Additional data may be gathered from surrounding vehicles in a data communication network to allow the controller to learn, from the experience of such vehicles, the most effective control profile for the current conditions at that location.

The multi-module approach to the disclosed embodiments allow for a "Limp Home" mode operation through redundancy. A central power take-off, in many of the embodiments, between two symmetric engines is used to power a common kinetic storage device (integrator) provides the ability to run on a single engine, should the other fail.

The position of the E-M/G in the disclosed embodiments connectable to the kinetic storage device allows for an all-electric vehicle ("EV") operation under various conditions. Examples of all EV conditions are:
Stop and go traffic;
Reversing or slow forward speed; and
Zero emissions operation (mandated in some locations or communities).

Because of the flexibility in coupling or decoupling the kinetic energy storage device from the transmission which is used to drive the vehicle, the disclosed embodiments can also function as a stand-alone generator for supplying electrical power outside of the vehicle. The engine(s) and E-M/G can be selectively coupled to the kinetic energy storage device while the kinetic energy storage device is decoupled from the transmission drive to create a portable generator set capable of supplying the nominal power output of the E-M/G.

Closed loop crankshaft phasing control is also achievable in the inventive concept, since the powertrain management control system can utilize multiple sensors to actuate the coupler mechanisms to engage and disengage the respective clutches that may be used in the couplers. The control system includes "Smart" adaptive control which compensates for changes in clutch wear, or changes in friction coefficient due to moisture/temperature, etc. Three high resolution speed sensors are included for each engine and one for the kinetic energy storage device (flywheel) to provide the information necessary for accurate synchronization of the two engine modules. This information allows the adaptive control system to phase the second engine to within 5 degrees of the primary engine within several engine cycles when both are running in tandem.

In addition to the integrated location of the E-M/G depicted in several disclosed embodiment, the electric motor/generator can be placed directly on one of the powertrain shafts or remotely mounted and coupled via conventional power transmission means such as a belt, chain or gear drive.

BRIEF DESCRIPTION OF THE DRAWINGS

FIG. 15 is chart of various operational modes, when the battery is at 75% charge or more.

FIG. 16 is chart of various operational modes when the battery is at 30% charge or less.

DETAILED DESCRIPTION OF THE INVENTION

While the inventive subject matter is summarized above as being applicable for several types of internal combustion engines, it is exemplified herein as being embodied with 2-cycle OPOC engine modules, such as that shown in the above-referenced U.S. Pat. No. 6,170,443.

Figure 1:
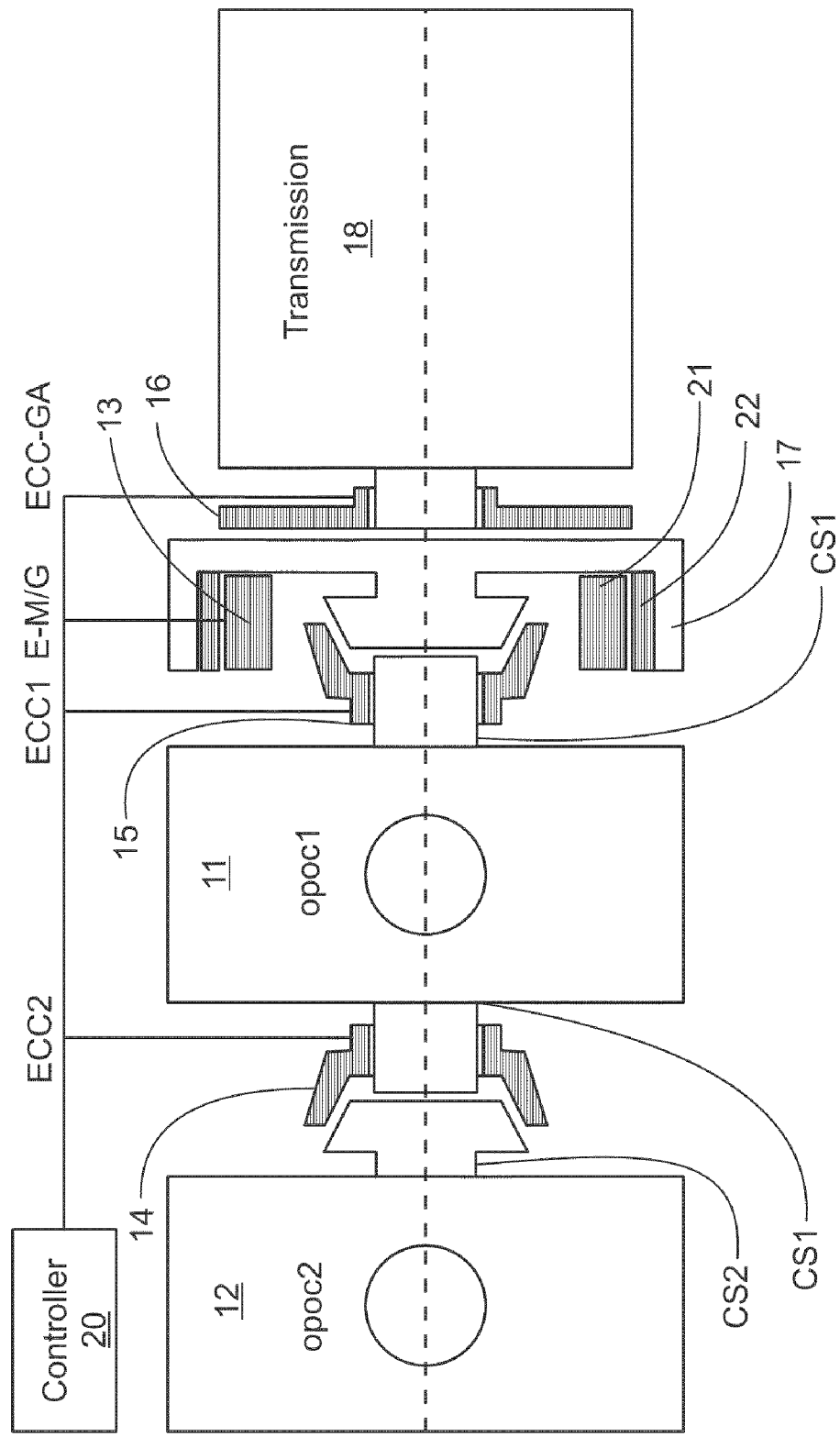
FIG. 1 is a schematic representation of a first embodiment of the inventive subject matter.

FIG. 1 illustrates a first embodiment 10 of the present invention which includes a primary OPOC1 ICE module 11, a secondary OPOC2 ICE module 12, an electrical Starter Motor/Generator E-M/G 13, and several electrically controlled couplings 14, 15 and 16, with receivers that provide various combinations of drive torque via a kinetic energy mass storage device (flywheel) 17 to a vehicle transmission load 18.

In each of the embodiments shown and described herein, the Starter Motor/Generator E-M/G and the kinetic storage device are depicted as separately functional elements. However, the two elements are interactive to a point that when the Starter Motor/Generator E-M/G is energized by the controller to act as either a motor or a generator, it is electrically coupled with the flywheel in order to operate. This is because the embodiments shown herein, take advantage of the mass offered by rotating permanent magnets that are normally found in a starter motor/generator by incorporating them in the flywheel mass. Therefore, when the Starter Motor/Generator E-M/G is not energized to act as either a motor or a generator, its permanent magnets are no longer functionally included therein, but still constitute part of the flywheel mass. It is certainly conceivable that one could construct an embodiment in which all the starter motor/generator elements are separate from the kinetic storage device if engineering conditions dictate a less efficient design than those shown herein.

In the first embodiment shown in FIG. 1, the flywheel 17 is connected to the transmission drive shaft 19 via a coupling ECC-GA, which is depicted here as an electrically controlled clutch 16 that is switchably activated by the controller 20.

Coupling ECC1 is depicted as an electrically controlled clutch 15 that is activated by controller 20 to provide a torque connection between flywheel 17 and a crankshaft CS1 extending from primary engine module 11. Coupling ECC2 is depicted as an electrically controlled clutch 14 that is activated by controller 20 to provide a torque connection between crankshaft CS1 and crankshaft CS2 extending from secondary engine module 12. In the alternative, ECC2 may be a hydraulic clutch that is closed by controlled hydraulic pressure.

Since the pistons in opposing cylinders of an OPOC engine module operate 180° out of phase, a second OPOC engine module can be timed to operate at 90° out of phase with respect to the first OPOC. Such timing provides a combined set of modules with a smoothly balanced operation. When both the primary and secondary engine modules are desired to be in operation, clutch ECC2 is activated in addition to ECC1. ECC2 slips when first activated until the phase angle between the two engine modules is at 90°. At that phase angle, clutch ECC2 closes and engages the crankshafts CS1 and CS2 so that the primary and secondary engines are working in tandem and in a phased relationship that maintains a smoothly balanced operation.

Starter Motor/Generator E-M/G contains stationary electromagnetic and electrically energizable coils 21 that function as the stator. The permanent magnets 22 of the Starter Motor/Generator E-M/G, in this and other disclosed embodiments, are carried by the flywheel and function as the rotor. The Starter Motor/Generator E-M/G is electrically coupled to the permanent magnets (rotor) 22 on the rotating flywheel 17 at the direction of controller 20. In motor mode, controller 20 switches electrical current to flow through the stationary (stator) coils 21 of the E-M/G from an on-board electrical energy source (battery, capacitor, fuel cell or other acceptable electrical charge storage device) to provide an induced rotational driving force to the permanent magnets 22 on the flywheel 17. In generator mode, controller 20 reverse switches electrical current induced in stationary (stator) coils 21 by permanent magnets (rotor) 22 rotating with flywheel 17 to flow back to the on-board electrical energy source and provide recharging, or regenerative braking.

In this manner, the Starter Motor/Generator E-M/G interacts with flywheel 17 when stator coils 21 of the Starter Motor/Generator E-M/G are switched by controller 20 to be electrically energized from an electrical source to drive flywheel 17; or to provide electrical recharging power back to the source from flywheel 17 when the flywheel 17 is being driven by other power sources.

Electrically activated clutch ECC-GA is energized by controller 20 and provides engagement between flywheel 17 and clutch 16 on the drive shaft 19 connected to transmission 18.

Figure 2:
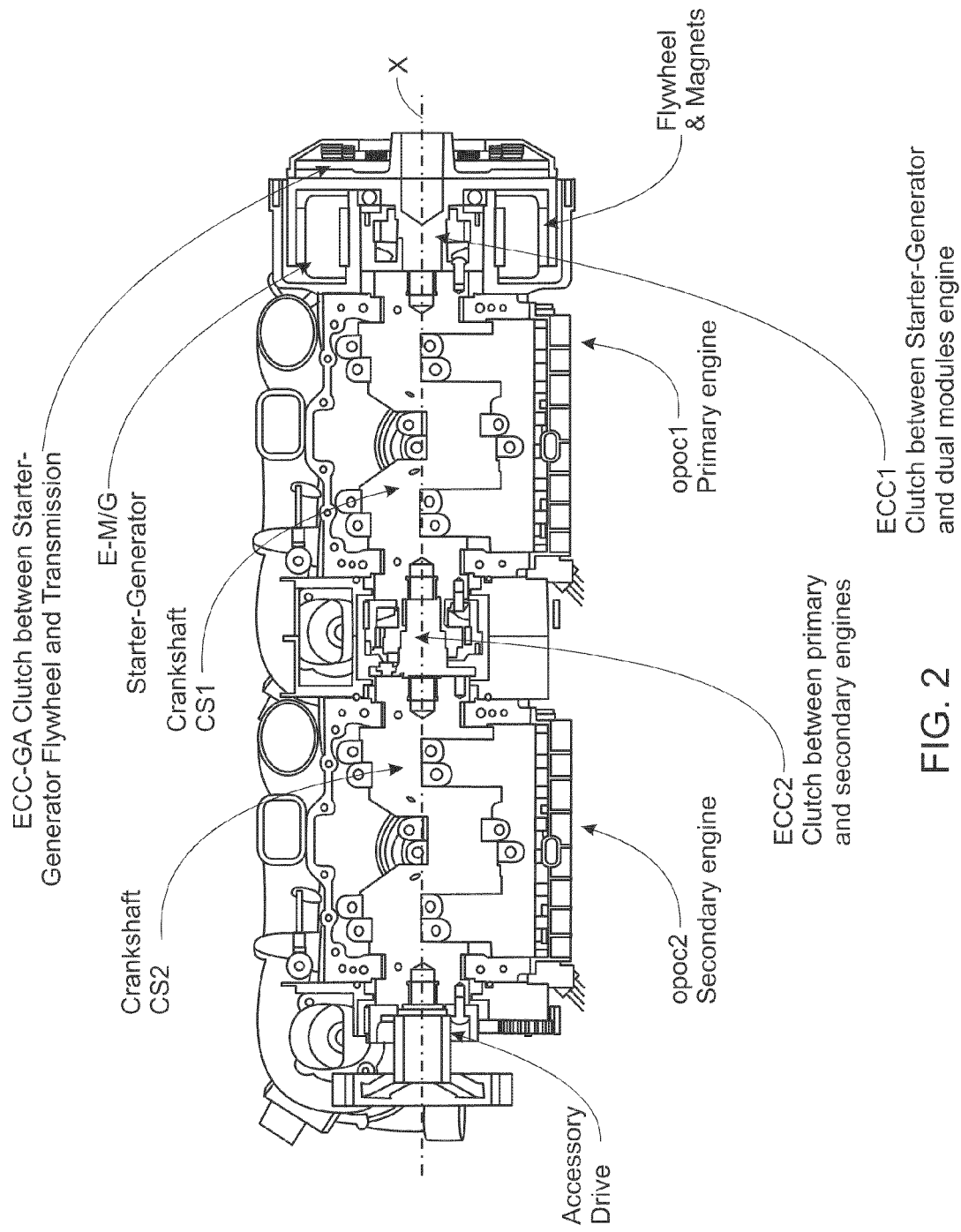
FIG. 2 is a cross-sectional view of the first embodiment of FIG. 1, taken along section line 2-2 in FIG. 3 through the crank shaft of a pair of OPOC engine modules configured for hybrid.
Figure 3:
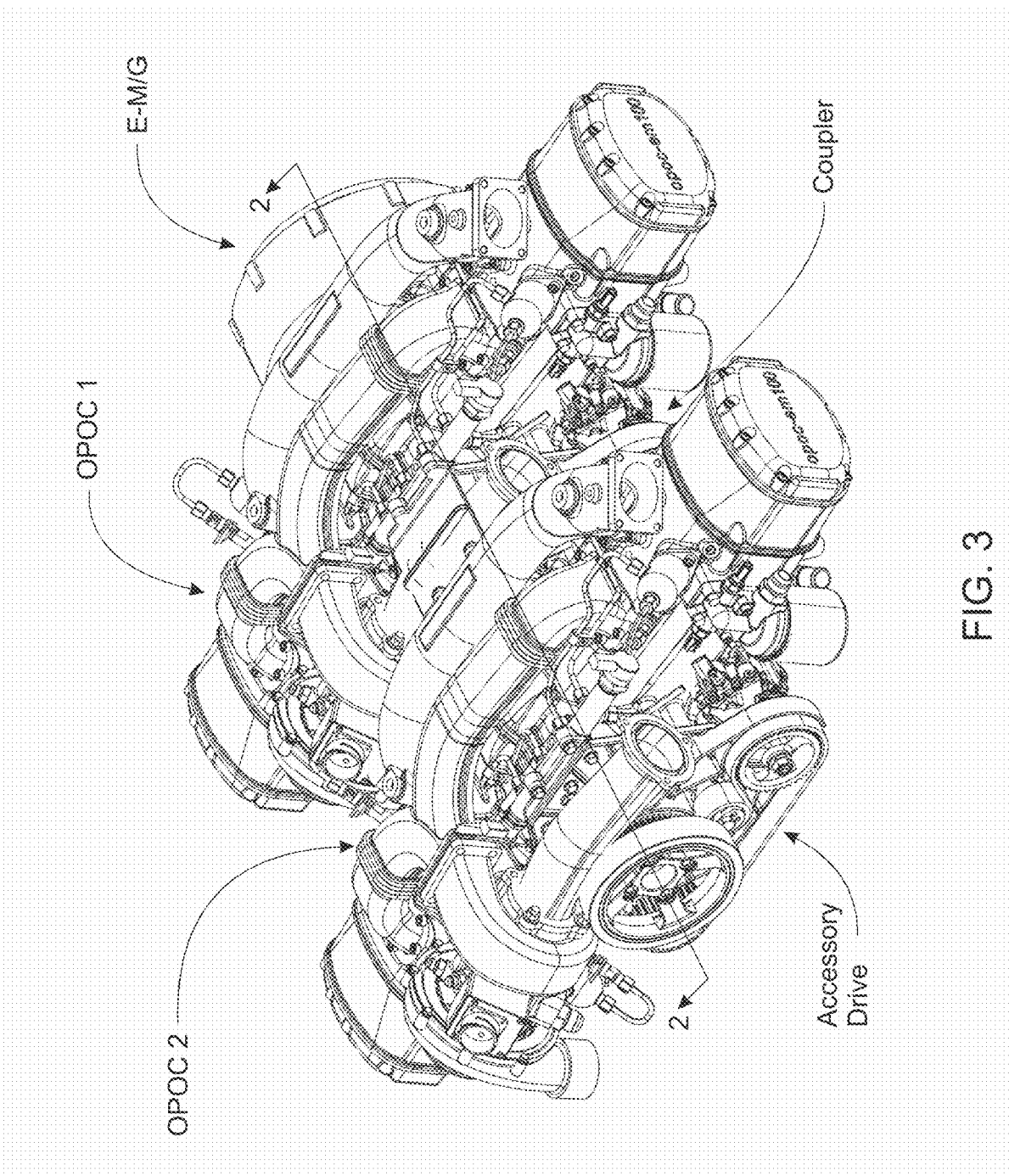
FIG. 3 is a perspective view of the first embodiment of the present invention.
Figure 4:
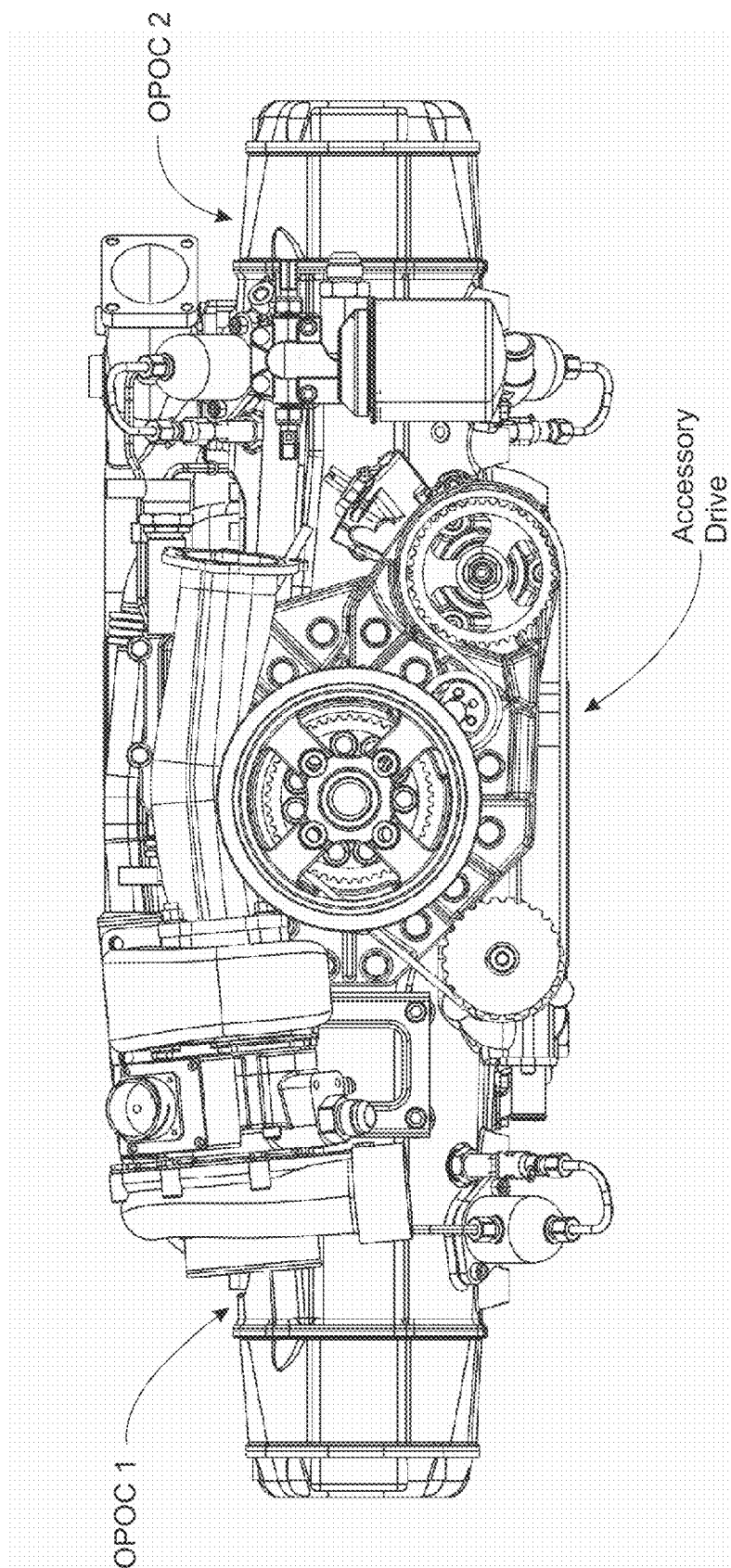
FIG. 4 is a front view of the first embodiment of the present invention shown in FIG. 3.

In FIGS. 2 and 3 and 4 the first embodiment of the present invention is shown in which primary and secondary engine modules OPOC1 and OPOC2, are physically assembled with a starter motor/generator unit E-M/G. As shown in the FIG. 2 cross-section of FIG. 3 taken along section lines 2-2, crankshafts CS1 and CS2 are both disposed along a rotational centerline axis "X", as is the Starter Motor/Generator E-M/G. At one end of crankshaft CS2, an accessory drive takeoff is provided. At the other end of crankshaft CS2, ECC2 clutch is located to provide coupling with crankshaft CS1 of engine module OPOC2. In these drawings of the first embodiment, the compact and integrated nature of the inventive concept can be appreciated.

Figure 5:
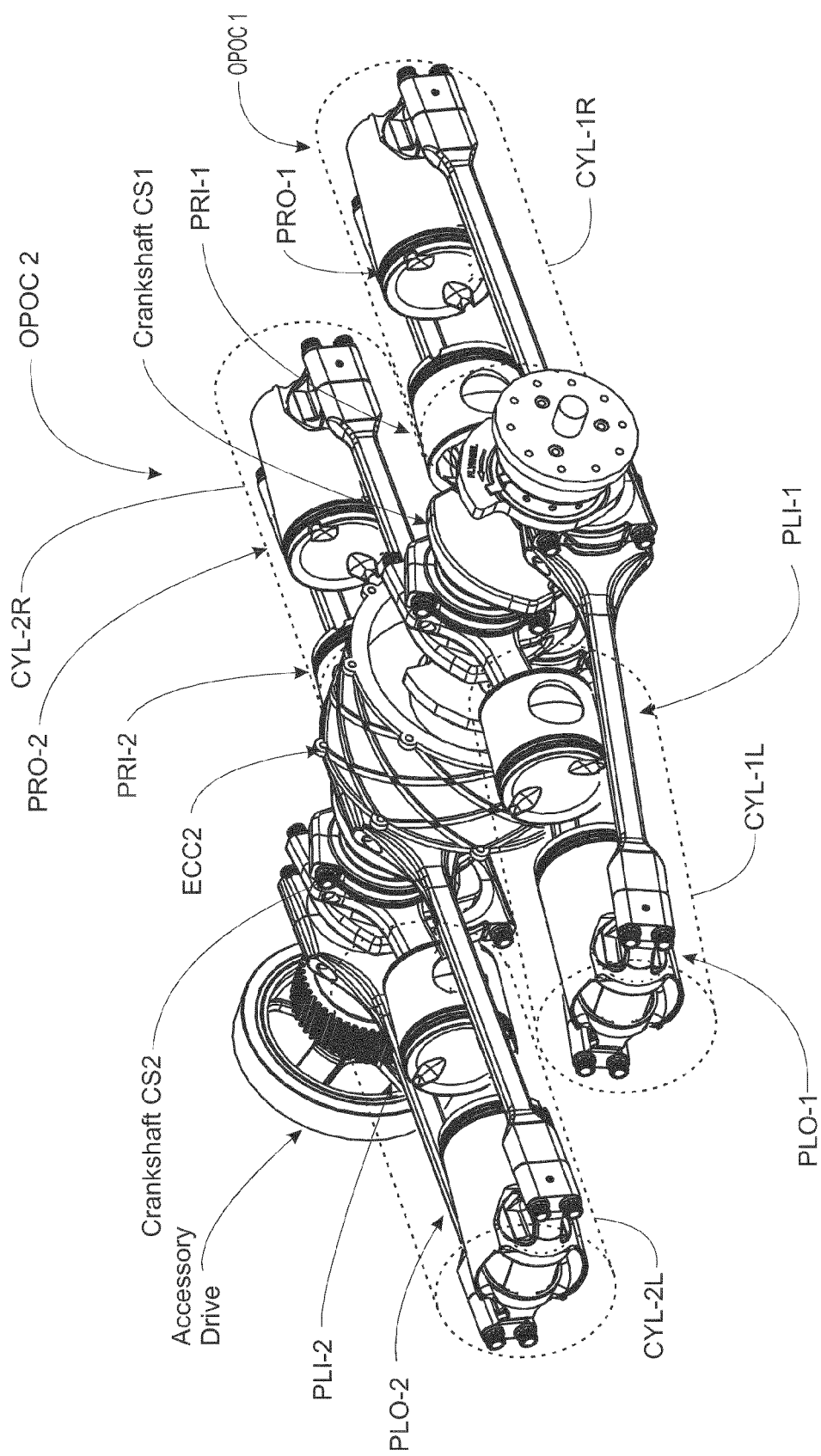
FIG. 5 is a perspective view cut-away view of a pair of OPOC engine modules showing the internal components configured for use as an embodiment of the present invention.

FIG. 5 is a cut-away view of the embodiment illustrated in FIGS. 2, 3 and 4 to show key internal moving components of the primary and secondary OPOC ICE modules, as well as the physical location of ECC2 clutch. The details of how an OPOC engine operates are not described here, since they are fully described in the above-referenced U.S. Pat. No. 6,170,443.

As shown in FIG. 5, the left and right cylinders CYL-1L and CYL-1R of primary OPOC1 engine module each contain a pair of inner and outer pistons. In the left cylinder CYL-1 of OPOC1 module, left outer piston PLO-1 is in opposition to left inner piston PLI-1. Similarly, but in opposite phase by 180°, the right cylinder CYL-1R of OPOC1 module, right outer piston PRO-1 is in opposition to right inner piston PRL-1. In this drawing, the pistons in OPOC1 are shown in intermediate phase positions between top dead center (TDC) and bottom dead center (BDC). Through the push rods for inner pistons and the pull rods for outer pistons, the oppositely and linearly moving pistons provide energy that causes rotation of crankshaft CS1.

With respect to the secondary OPOC2 engine module, the left cylinder CYL-2L contains left outer piston PLO-2 which is in opposition to left inner piston PLI-2. Similarly, but in opposite phase by 180°, the right cylinder CYL-2R contains right outer piston PRO-2 in opposition to right inner piston PRL-2. In this drawing, the pistons in the OPOC2 module are shown in TDC (right) and BDC (left) positions. This illustrates the 90° phase difference between the OPOC1 and OPOC2 modules that was discussed above.

Figure 6:
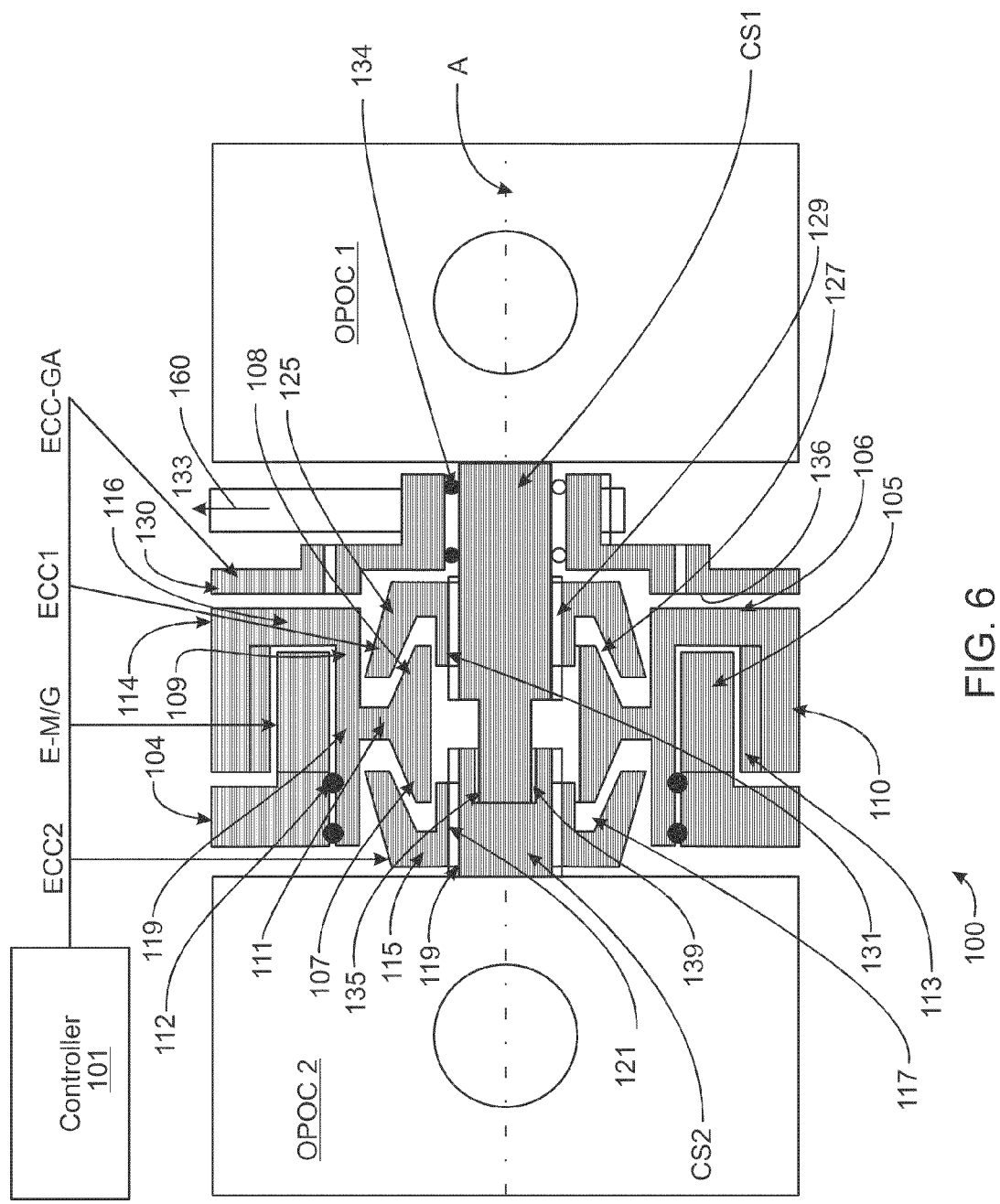
FIG. 6 is a cross-sectional view of a second embodiment of the inventive subject matter.

FIG. 6 illustrates a second embodiment of the inventive concept. In the second embodiment, the coupling system 100 for transferring power is physically located between a primary OPOC1 ICE module and a secondary OPOC2 ICE module. A Starter Motor/Generator E-M/G is also configured to have an electromagnetic coupler between its stationary coils 105 mounted on stator 104, and permanent rotor magnets 113 mounted on rotating flywheel 110. Coupling system 100 provides power transfer between a plurality of powerable modules. In this case, the Starter Motor/Generator E-M/G 104, primary engine module OPOC1 and secondary engine module OPOC2 are powerable modules and are shown with moving elements in the form of permanent rotor magnets 113 on flywheel 110, crank shaft CS1, and crank shaft CS2, respectively. Each of the moving elements are configured to rotate about a common axis "X". Crankshafts CS1 and CS2 are shown to be co-supported through a cylindrical extension 139 of CS1 inside a bore 135 in the end of CS2. This co-support is appropriately provided with bearings and/or bushings to ensure there is minimal friction between the two crankshafts while maintaining their axial alignment.

Flywheel 110 is mounted for rotation, also about the common axis X, and functions as a kinetic energy storage device and as an integrator, that sums the power input to it and provides the transfer of power output. Starter Motor/Generator E-M/G contains a first receiver in the form of stationary stator coils 105 which are electro-magnetically linked to the rotating permanent rotor magnets 113 mounted on flywheel 110. The crankshaft CS1 of primary engine module OPOC1 is linked to a second receiver in the form of a movable clutch element 125 that is mounted on splines 131 to rotate with the crankshaft CS1 and to be actuatable to slide along splines 131 in an axial direction on CS1. Clutch element 125 contains a clutch face 127 that is engagable with a corresponding face 108 on flywheel 110 in response to the ECC1 signal. The crankshaft CS2 of secondary engine module OPOC2 is linked to a third receiver in the form of a movable clutch element 115 that is mounted on splines 121 to rotate with the crankshaft CS2 and to be actuatable to slide along splines 121 in an axial direction on CS2. Clutch element 115 contains a clutch face1 17 that is engagable with a corresponding face 107 on flywheel 110 in response to the ECC2 signal. The transfer of power out by flywheel 110 occurs via an actuatable coupler element in the form of ECC-GA signaled clutch 130 that engages flywheel 110 and connects the flywheel 110 via a gear, belt, chain or other torque conveyance linkage 133 to a transmission 160. Clutch 130 is mounted on crankshaft CS1 through bearings 134 which provide support while allowing for friction-free rotation with respect to crankshaft CS1. Clutch 130 contains a radial and planar clutch face 136 that is engagable with a corresponding radial and planar face 106 on flywheel 110. A switching control signal is provided by the programmable controller 101 that provides the ECC-GA switch signals to cause the engagement of the flywheel integrator with one or more receivers according to a selected power profile defining which powerable modules are to be engaged. The controller 101 may be any suitable programmable device that operates to provide electrical signals or hydraulic pressure to cause the coupler receivers to be actuated or activated in accordance with preprogrammed parameters.

Flywheel 110 is shown in FIG. 6 as an open center disk having a convoluted cross-section taken diametrically along its axis of rotation. A cylindrical axle portion 109 having an outer circular surface 119 is mounted for support and free rotation on bearings 112 located between the inside annular surface of stator 104 of Starter Motor/Generator E-M/G. Flywheel 110 includes a web extension 111 from axle 109 to form engagable angular cylindrical faces 107 and 108 that extend conically outward therefrom and towards the axis. The outer rim 114 of flywheel 110 is joined to the axle 109 by a radial portion 116 and has the permanent rotor magnets 113 attached to the underside thereof.

Figure 7:
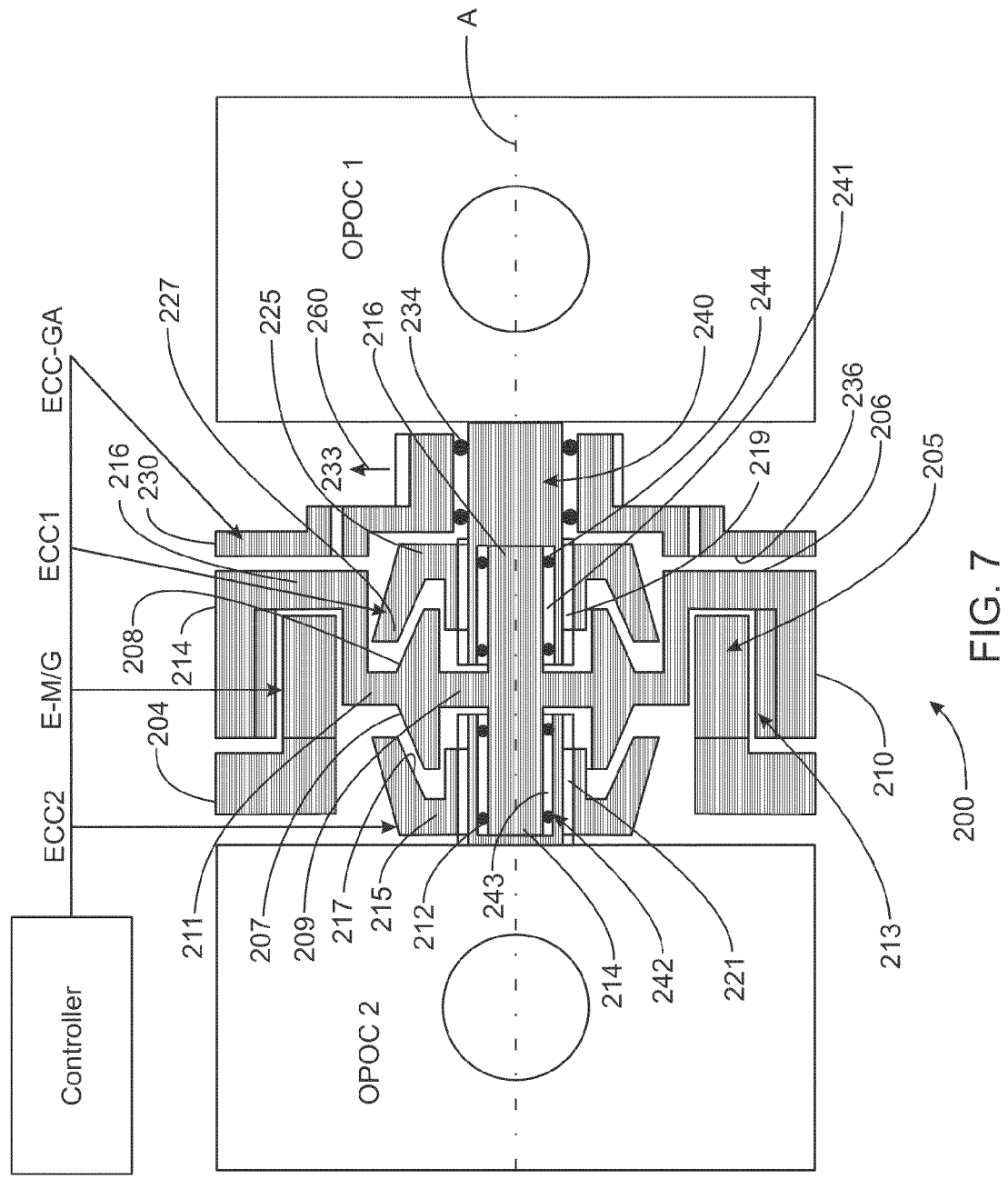
FIG. 7 is a cross-sectional view of a third embodiment of the inventive subject matter.

FIG. 7 illustrates a third embodiment of the inventive concept. In the third embodiment, the coupling system 200 for transferring power is physically located between a primary OPOC1 ICE module and a secondary OPOC2 ICE module. A Starter Motor/Generator E-M/G is also configured to have an electromagnetic coupler between its stationary coils 205, mounted on stator 204, and rotating permanent rotor magnets 213 located physically within the integrator flywheel 210. Coupling system 200 provides power transfer between a plurality of the powerable modules. In this case, the Starter Motor/Generator E-M/G, primary engine module OPOC1 and secondary engine module OPOC2 are powerable modules and are shown with moving elements in the form of rotor magnets 213, crank shaft (CS1) 240 and crank shaft (CS2) 242, respectively. Each of the moving elements is configured to rotate about a common axis "X".

Flywheel 210 is mounted for rotation, also about the common axis X, and functions as a kinetic energy storage device and as an integrator that sums the power input to it and provides the transfer of power output. Starter Motor/Generator E-M/G contains a receiver in the form of stationary coils 205 which are electro-magnetically linked to the rotating permanent magnets 213. The CS1 crankshaft 240 of primary engine module OPOC1 is linked to a first receiver in the form of a movable clutch element 225 that is mounted on splines 219 to rotate with the CCS1 crankshaft 240 and to be actuatable to slide along splines 219 in an axial direction on CS1 crankshaft 240. Clutch element 225 contains a clutch face 227 that is engagable with a corresponding face 208 on flywheel 210 in response to the ECC1 signal. The CS2 crankshaft 242 of secondary engine module OPOC2 is linked to a receiver in the form of a movable clutch element 215 that is mounted on splines 221 to rotate with CS2 crankshaft 242 and to be actuatable to slide along splines 221 in an axial direction on CS2 crankshaft 242. Clutch element 215 contains a clutch face 217 that is engagable with a corresponding face 207 on flywheel 210 in response to the ECC2 signal. The transfer of power by the flywheel 210 occurs via an actuatable coupler element in the form of ECC-GA signaled clutch 230 that engages flywheel 210 and connects the flywheel 210 via a gear, belt, chain or other torque conveyance linkage 233 to a transmission 260. Clutch 230 is mounted on CS1 crankshaft 240 through bearings 234 which provide support while allowing for friction-free rotation with respect to crankshaft 240. Clutch 230 contains a planar clutch face 236 that is engagable with a corresponding face 206 on flywheel 210. A switching control is provided by the programmable controller 201 that provides the ECC-GA switch signals to cause the engagement of the integrator with one or more receivers according to a selected power profile defining which powerable modules are to be engaged.

Flywheel 210 is shown in FIG. 7 as a disk with a center axle shaft and having a convoluted cross-section taken diametrically along its axis of rotation. A central axle has symmetric cylindrical shaft portions 214 and 216 extending from its balanced center. Axle shaft portions 214 and 216 are mounted for free rotation on bearings 244 and 212 within bores 241 and 243 in respective CS1 crankshaft 240 and CS2 crankshaft 242. Flywheel 210 includes a radial web extension 209 from its axle to form engagable angular cylindrical faces 207 and 208 that extend conically outward therefrom. The outer rim 214 of the flywheel 210 is joined to the extension 209 by a radial portion 216 and has the permanent rotor magnets 213 attached to the underside thereof.

The key distinction of the third embodiment from the second embodiment is the configuration and mounting of the flywheel with respect to the axially aligned crankshafts of the primary and secondary engine modules.

Figure 8:
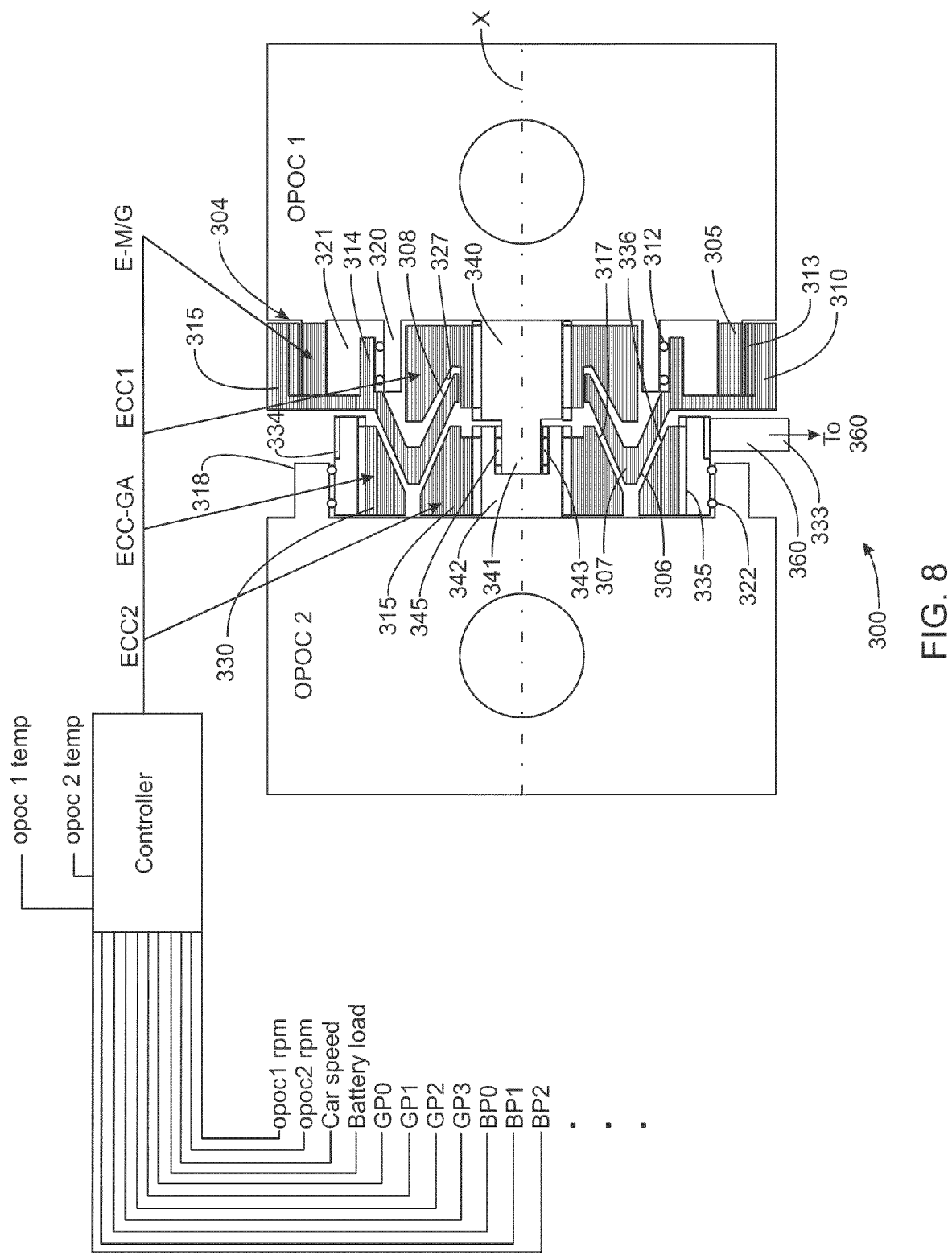
FIG. 8 is a cross-sectional view of a fourth embodiment of the inventive subject matter.

A fourth embodiment is shown in FIG. 8 and allows a more compact arrangement for a coupler system 300 by providing annular bearing race supports on the engine module housings. In this case, the annular bearing support 320 is provided on the primary engine module OPOC1. Annular bearing support 320 serves as an axle that supports bearings 312 and the hub 314 of flywheel 310. Annular hub 314 is formed in flywheel 310 with a relatively large diameter for mounting on bearing support 320 and allows for a greater concentration of mass towards the outer rim 315 of flywheel 310. A second annular bearing support 318 is provided on secondary engine module OPOC2 to allow a power takeoff drum 334 to be mounted for rotation on bearings 322. Take-off drum 334 contains a plurality of splines 335 for allowing axial movement of clutch receiver 330. Take-off drum 334 is associated with ECC-GA signaled clutch receiver 330 and the two elements rotate together when engaged with integrator flywheel 310. A third annular support 321 is formed on primary engine module OPOC1 and supports stationary coils 305 and function as the stator of Starter Motor/Generator E-M/G 304. This embodiment integrates the stator portion of the starter motor/generator function onto the housing of the primary engine module OPOC1. The crankshafts 340 and 342 are nested, as in the second embodiment, but because of the integration of the starter motor onto the housing of an engine module, the distances between the engines can be reduced, as well as the length of each crankshaft.

Figure 9:
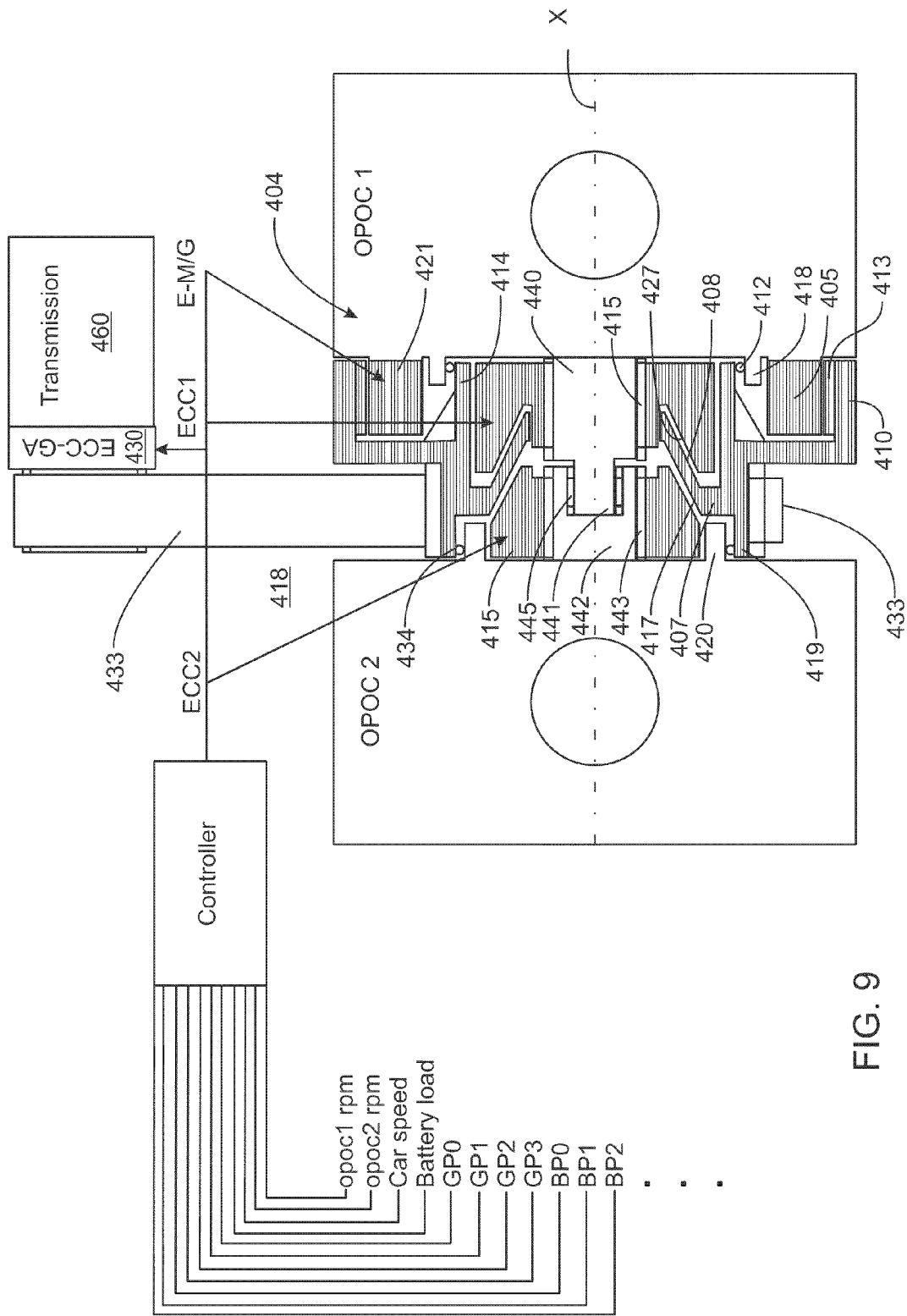
FIG. 9 is a cross-sectional view of a fifth embodiment of the inventive subject matter.

A fifth embodiment is shown in FIG. 9 and provides another compact configuration in coupling system 400. In the fifth embodiment, flywheel 410 is mounted for free-wheeling rotation on two annular bearing supports 418 and 420 respectively extending from the housings of the primary and secondary engine modules OPOC1 and OPOC2. Similar to the fourth embodiment, a stator 408 of Starter Motor/Generator E-M/G 404 is integrated into an engine module housing to allow a more compact package. In addition, the ECC-GA signaled coupling clutch 430 is remotely located with the transmission. This configuration may be desirable where engine compartment volume and dimensions do not allow for the other embodiments.

Figure 10:
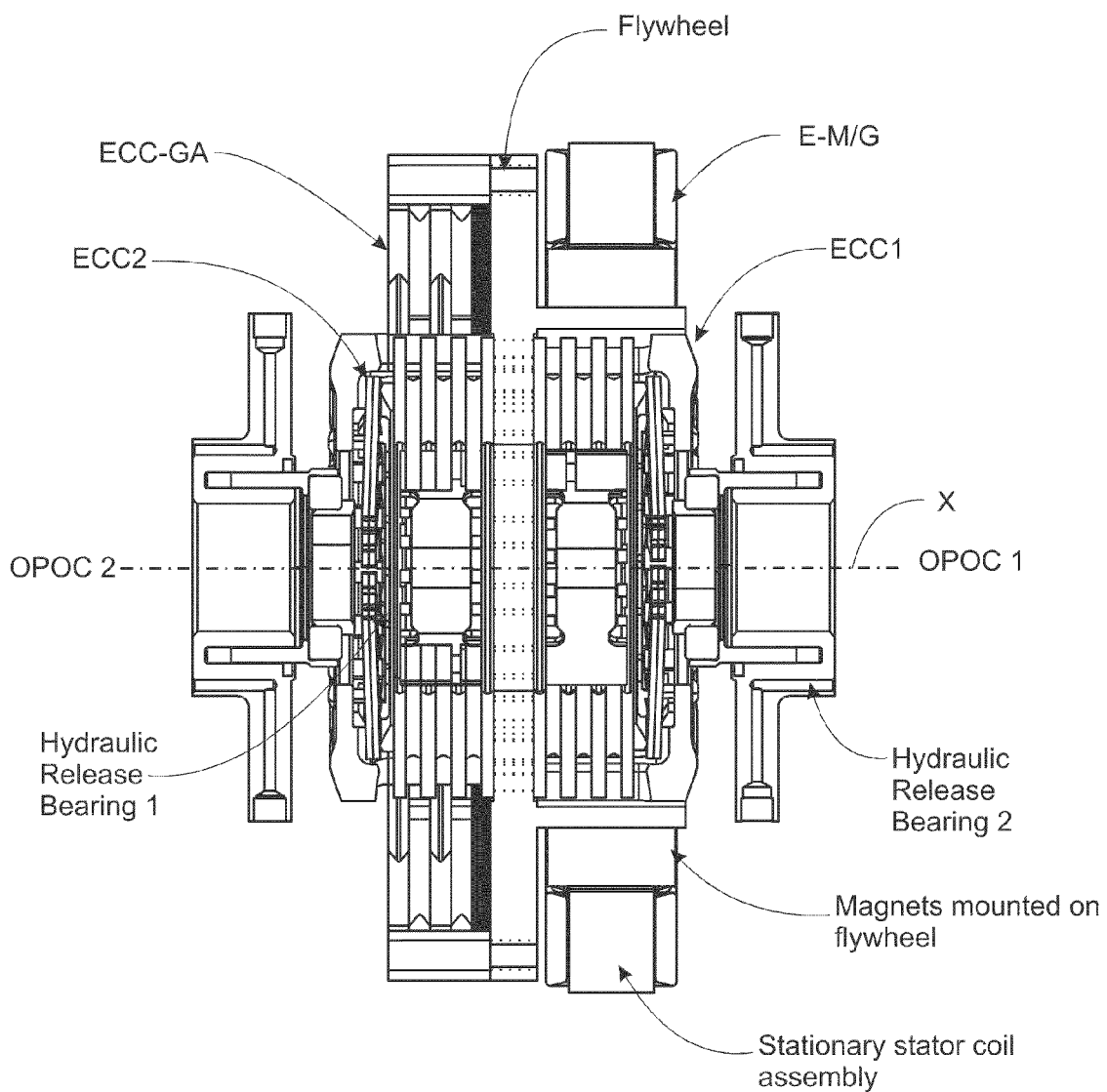
FIG. 10 is a cross-sectional view of a model of a sixth embodiment of the inventive subject matter.
Figure 11:
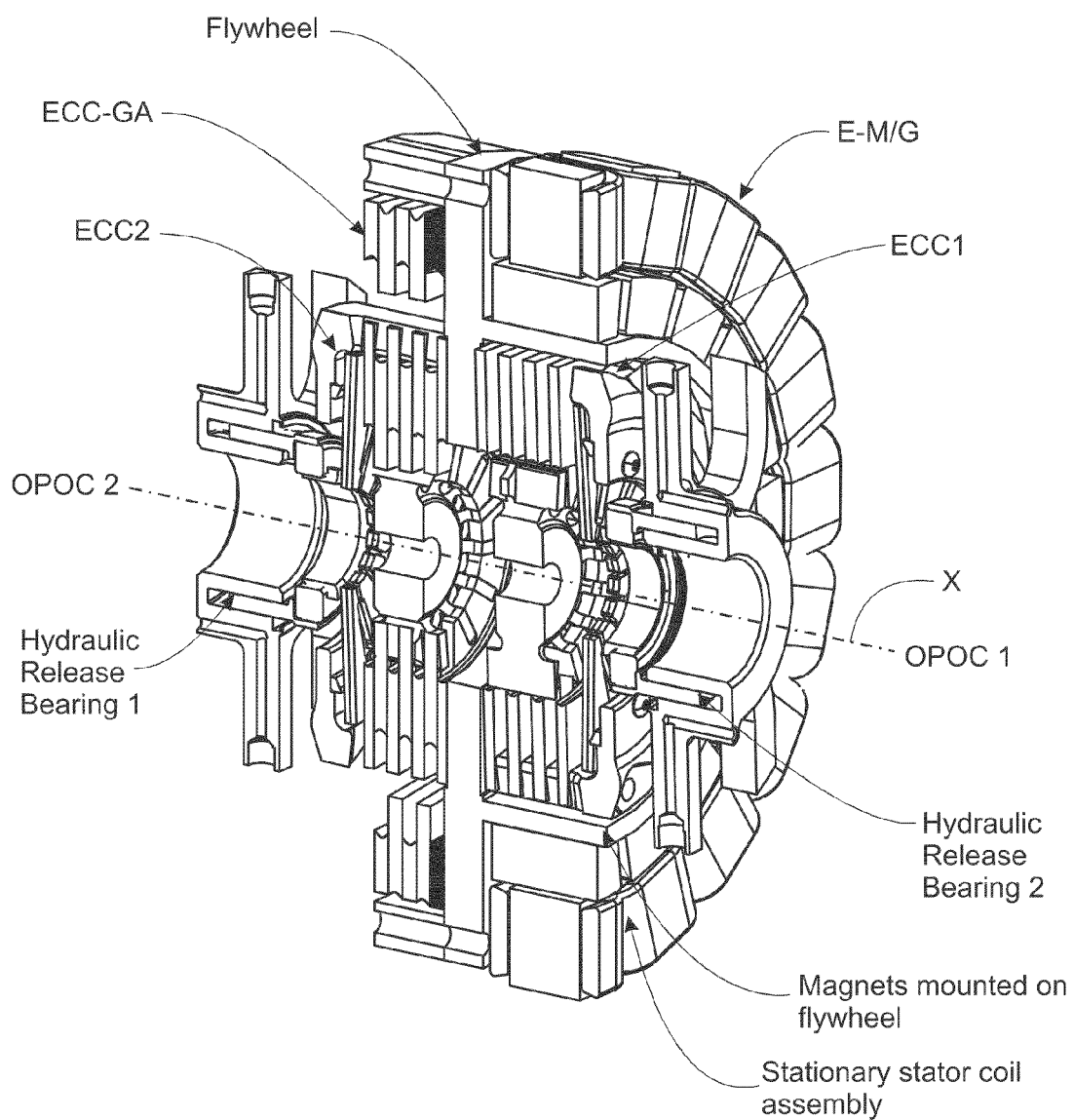
FIG. 11 is a perspective sectional view of a model of the sixth embodiment of the inventive subject matter.

A sixth embodiment of the inventive concept is shown in FIGS. 10 and 11. In this sixth embodiment, a flywheel is freewheeling mounted on the central axis X with a large surfaced disc extending towards its outer rim. The ECC1 and ECC 2 signaled clutch faces are also large to provide secure adherence to the flywheel when activated. Hydraulic release bearings are shown which act with the respective clutches to make sure no engine drag persists when the clutches are deactivated.

Figure 12:
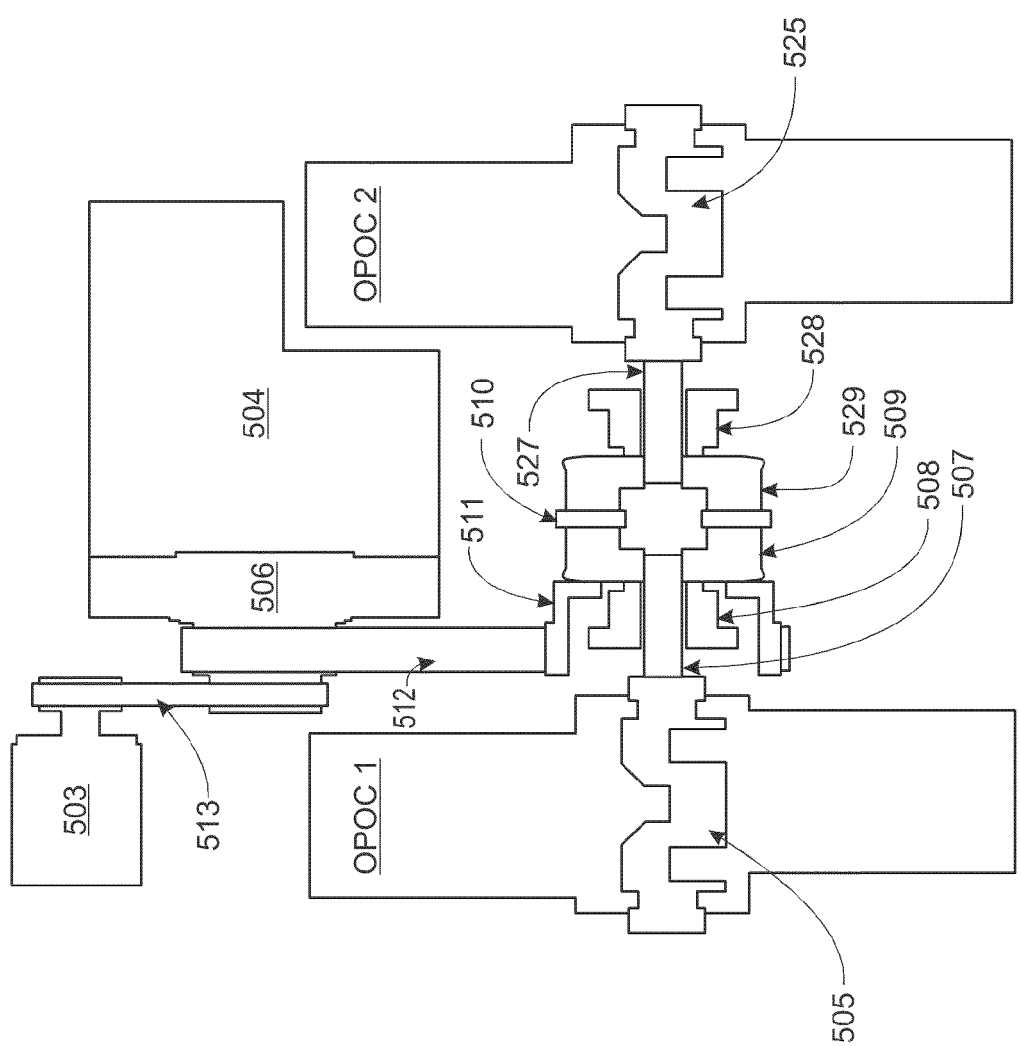
FIG. 12 is a conceptual representation of a seventh embodiment of the inventive subject matter of the present invention.

A seventh embodiment is shown in FIG. 12 wherein the key elements are represented. Primary engine module OPOC1 has a crankshaft 505 that has a take-off shaft 507 that is axially aligned with similar elements of secondary engine module OPOC2. A first clutch element 508/509 is engagable with a clutch plate 510 to connect the primary OPOC 1 through a take-off drum 511 and belt drive 512 to a flywheel 506 that is engagable with a transmission 504. OPOC2 has a crankshaft 525 that has a take-off shaft 527. A second clutch element 528/529 is engagable with a clutch plate 510 to connect the secondary OPOC in tandem with the primary OPOC module. A starter motor/generator 503 is remotely located from the engine module couplings, but is nevertheless coupled to the flywheel through belt drive 513 and an engagable third clutch within the belt drive to the flywheel 506.

Figure 13:
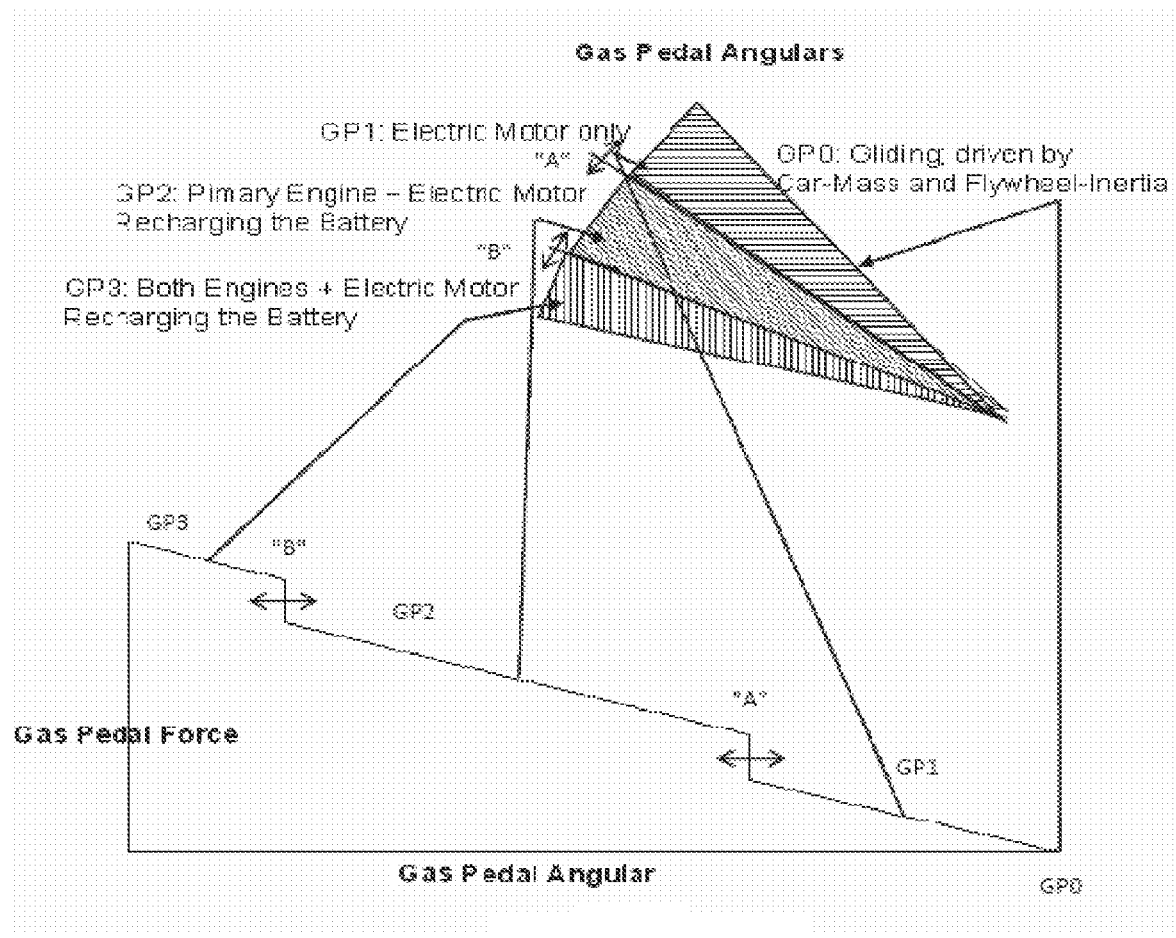
FIG. 13 is a plot showing an example of an operational control based on a gas pedal scenario during coasting and acceleration.

In operation, the embodiments are controlled to follow a predetermined set of parameters (or profile) to ensure a reliable, responsive and efficient performance. The plot in FIG. 13 illustrates the general scenario of an activation profile of the inventive subject matter during vehicle coasting and various degrees of acceleration demand. The bottom stepped plot is divided into 3 ranges of throttle activation at break points "A" and "B". (Of course, many more or less break points can be used to program an operational profile. This description is an example of the principles involved.) In this case, operation is exemplified based on a typical foot "Gas" pedal in which depression is measured in an angle from rest. (Other interface devices, such as joy sticks, trackballs, hand levers, and hand grips, cruise control systems and automatic braking systems also may be used to effect control.) In a condition where there is no depression of the Gas pedal (GP0), none of the OPOC ICE modules are engaged or running. Also, there is no drag offered by the Starter Motor/Generator E-M/G, since it is not electrically engaged. However, the flywheel is engaged to the transmission through the ECC-GA signaled coupling. Any residual kinetic inertia energy that was present in the flywheel and the mass inertia of the vehicle when the Gas pedal was restored to a no depression GP0 position is provided to the transmission load through the ECC-GA signaled coupling. (However, to increase fuel efficiency, when the depression is at GP0, one can employ a "glide" type transmission that disengages from the drive wheel(s) and allows them to freewheel.) As the Gas pedal is depressed at a range of low angles and low forces in the GP1 range, the Starter Motor/Generator E-M/G is energized as a drive motor from battery voltage to spin up the flywheel to a predetermined speed that provides drive power through the ECC-GA signaled coupling to the transmission load. As the Gas pedal is further engaged at an intermediate range of angles and forces in the GP2 range, the primary engine module OPOC1 is started by activating the ECC1 coupling to a closed position. Energy available from the flywheel applies torque to the OPOC1 crankshaft CS1 and starts OPOC1 ICE module. Thereafter, while primary OPOC1 is engaged, it provides power to the flywheel and transmission load.

Each time the GP2 range is entered and the ECC1 signaled coupling is closed, the Starter Motor/Generator E-M/G and primary engine module OPOC1 may be used together, in tandem, to provide combined drive power to the flywheel and transmission load, or the OPOC1 can be used alone. If a primary OPOC1 ICE module is used which has a relatively low power capacity, or has characteristics that require supplemental power transitionally when it is being subjected to a cold start, the E-M/G may be engaged to provide supplemental power in tandem with the OPOC1 ICE module, for at least a limited time period. On the other hand, if a primary OPOC1 engine module is used which has a relatively high power capacity or is warm from prior usage, the Starter Motor/Generator E-M/G may not be necessary for supplemental power and may be switched by the controller to function as a generator and provide recharge current back to the electrical source or be disengaged entirely to remain off-line. With the E-M/G functioning as a generator or being off-line, the primary OPOC1 ICE module is the sole source of drive power to the vehicle. There may be other design considerations that dictate some combination of tandem assist by the electric motor and recharge during the GP2 range that can be programmed into the controller.

When the driver desires to accelerate the vehicle by applying a relatively high force to the Gas pedal in the high angle GP3 range, the ECC2 signaled coupling is also engaged, along with ECC1 signaled coupling, and secondary OPOC2 ICE module starts to run by the torque being applied to its crankshaft CS2. OPOC2 ICE module then adds its power contribution to the already energized primary OPOC1 ICE module. In instances where maximum power is required, Starter Motor/Generator E-M/G is also connected in tandem to add its power to the system. Otherwise, in the GP3 range, with both primary and secondary ICE modules operating together as a single engine the Starter Motor/Generator E-M/G is operated as a generator to charge the batteries. This continues until the Gas pedal force is adjusted to cause EEC2 signaled coupling to open and OPOC2 ICE module to be disengaged and to stop.

Figure 14:
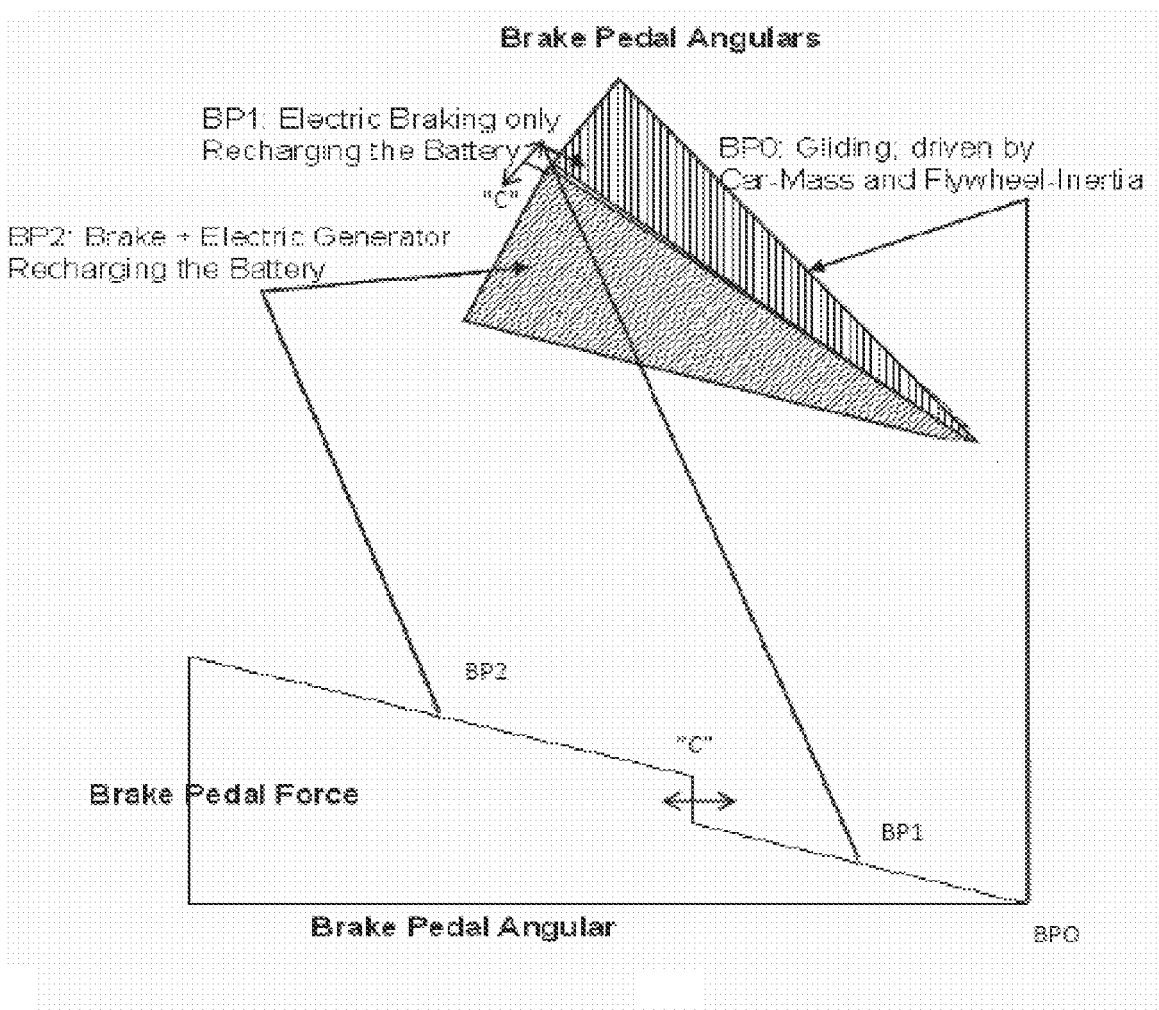
FIG. 14 is a plot showing an example of the operational control of a brake pedal scenario during coasting, deceleration and braking.
Figure 17A:
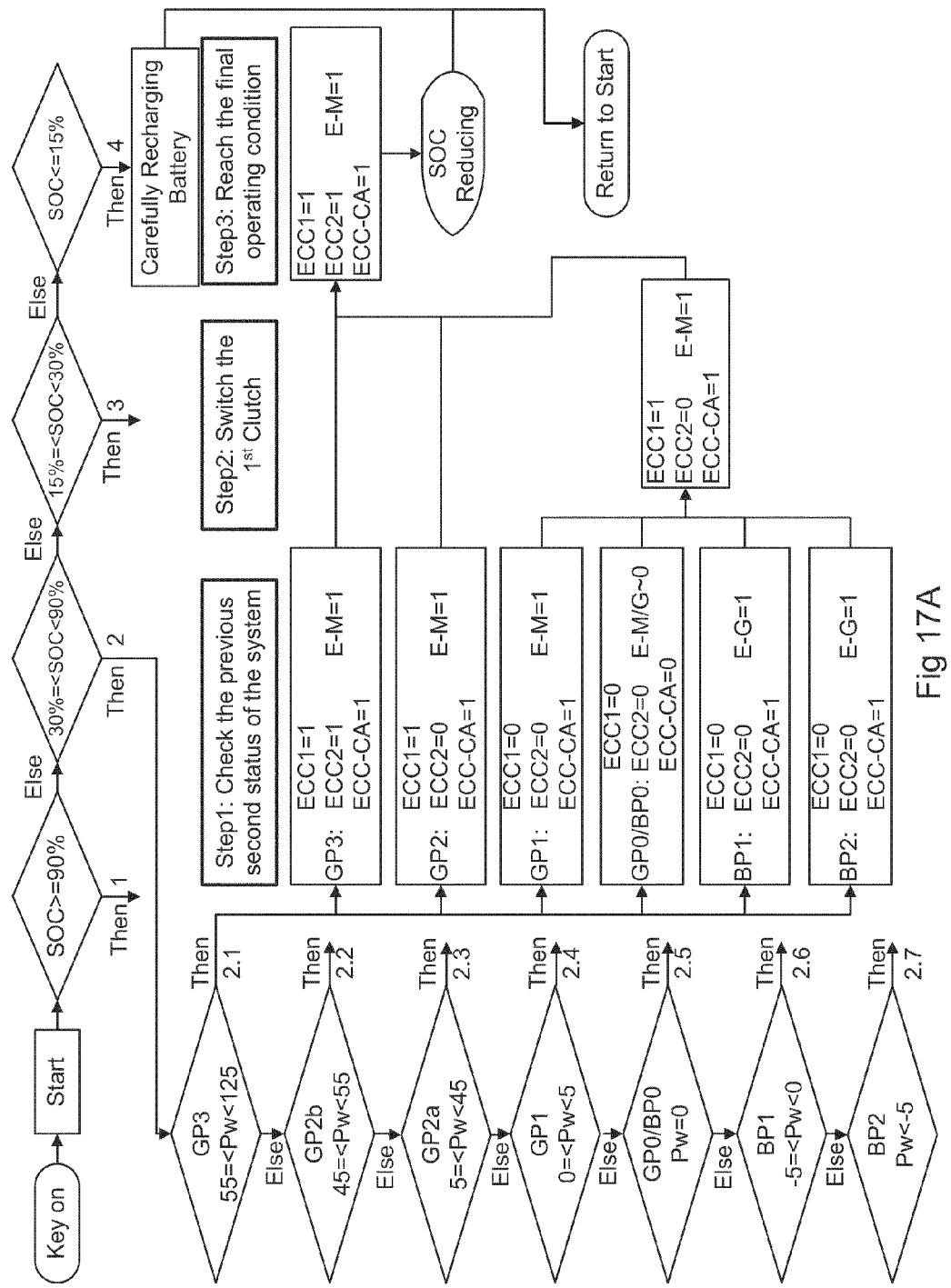
FIGS. 17A-17L constitute a detailed flow chart of the process used for controlling the operation of the present invention.
Figure 17B:
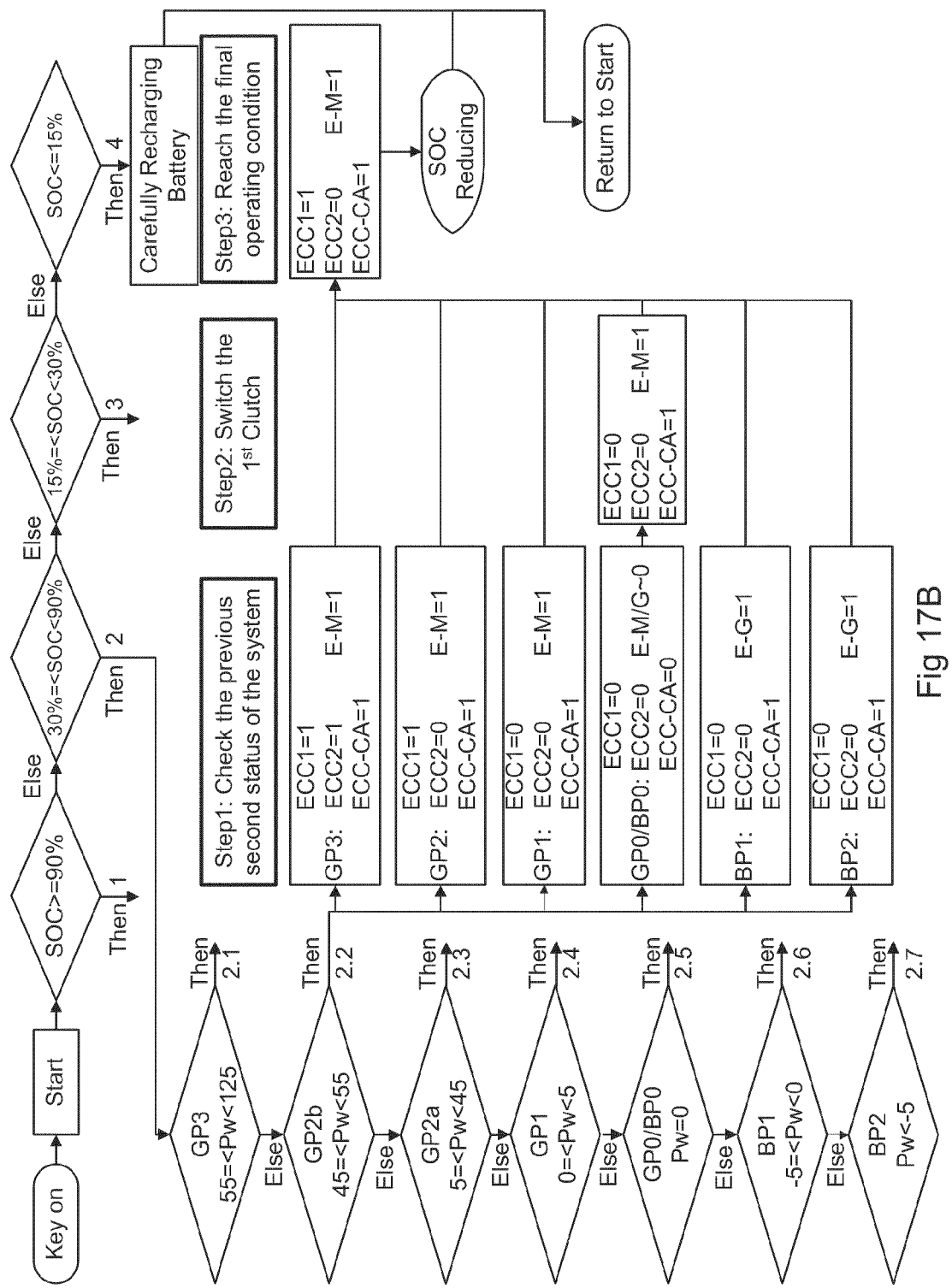
Figure 17C:
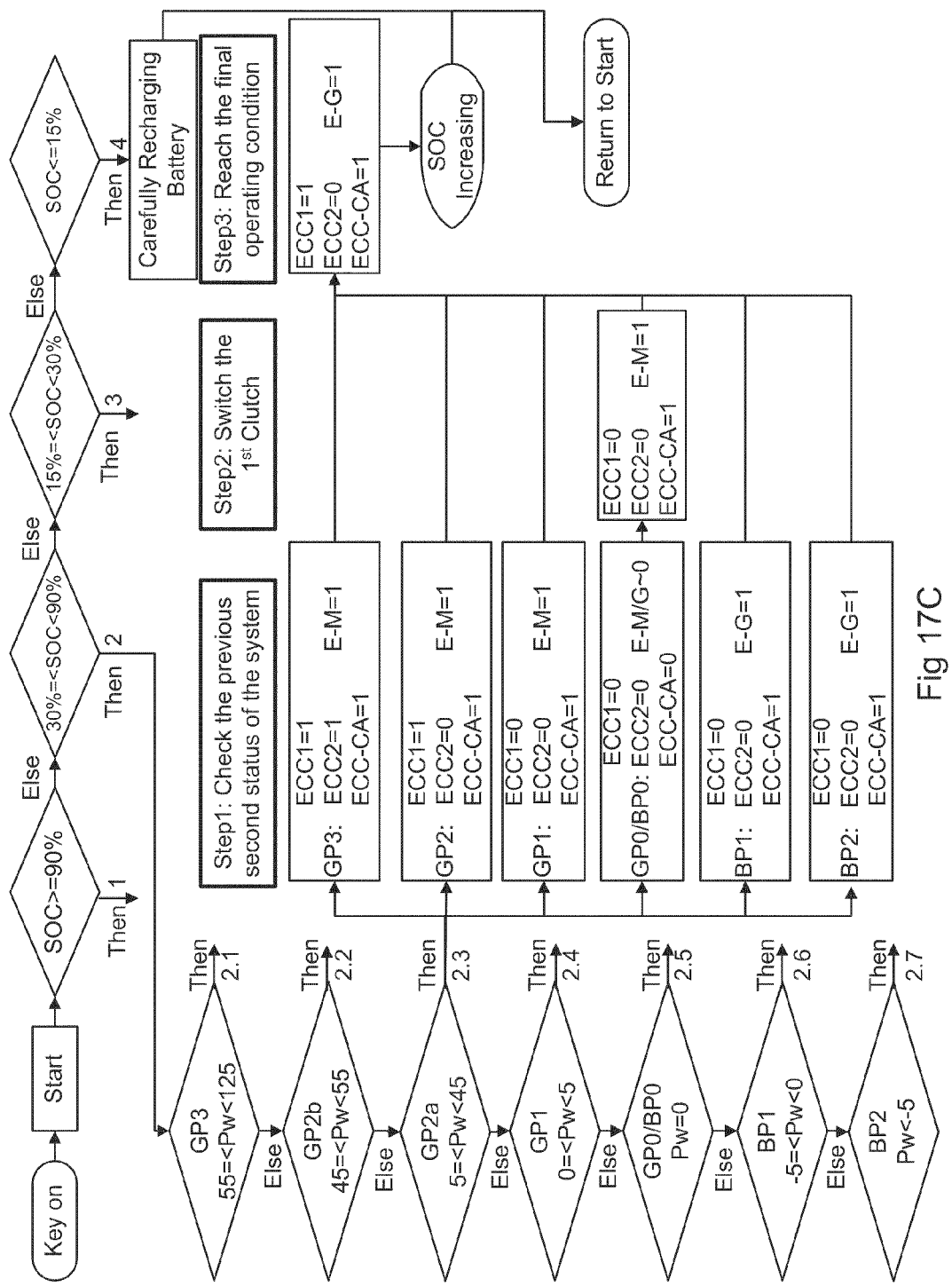
Figure 17D:
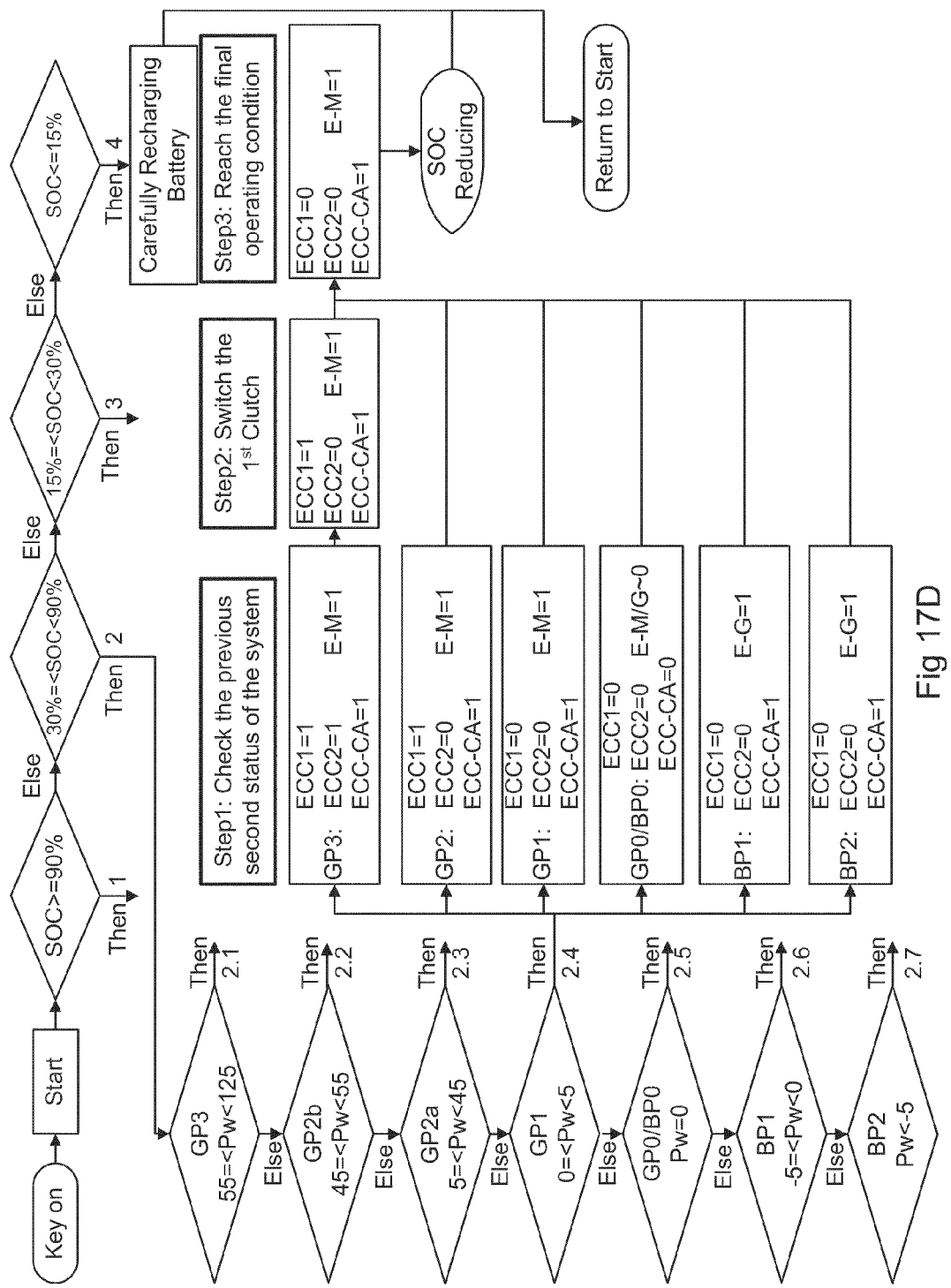
Figure 17E:
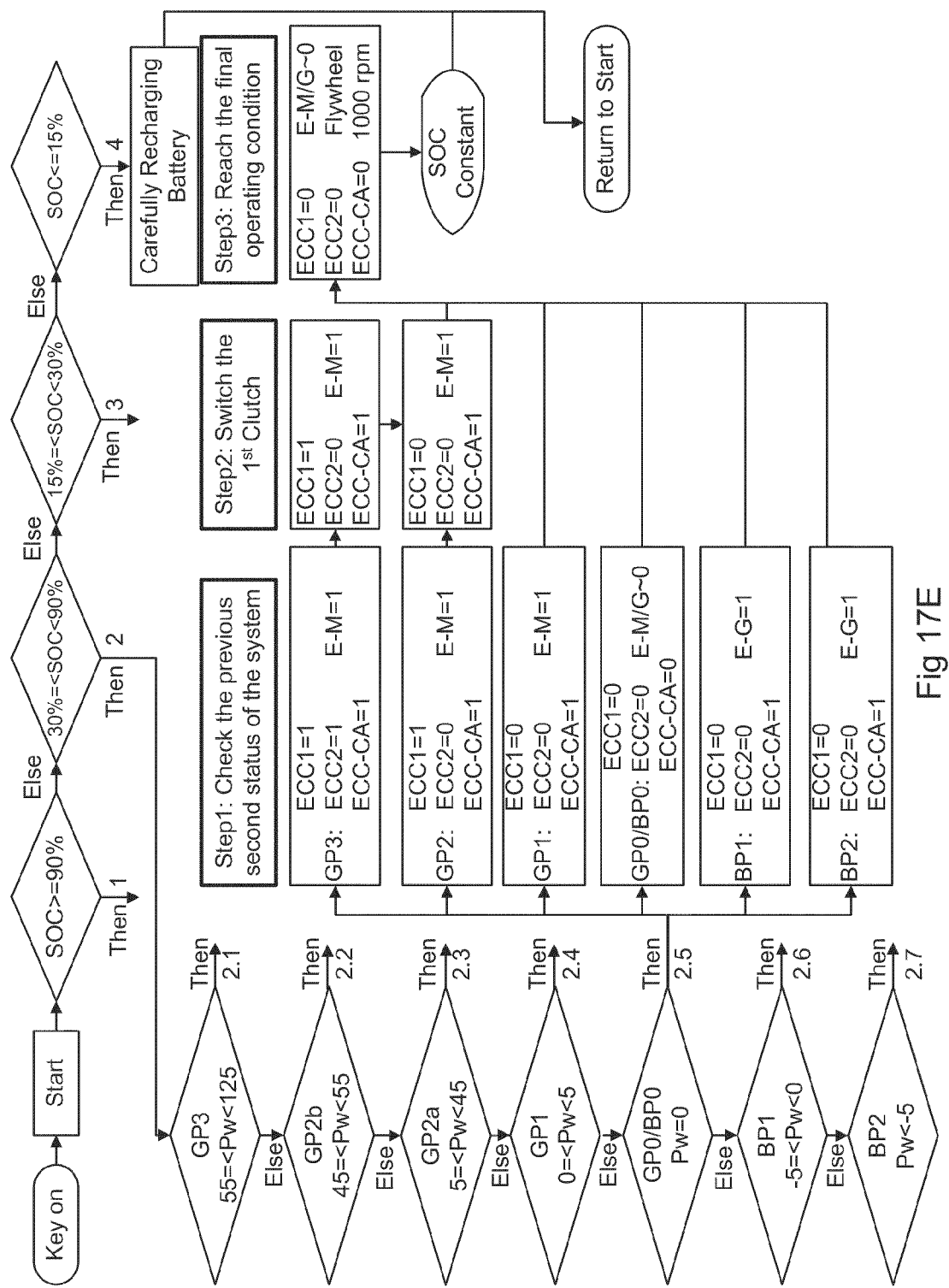
Figure 17F:
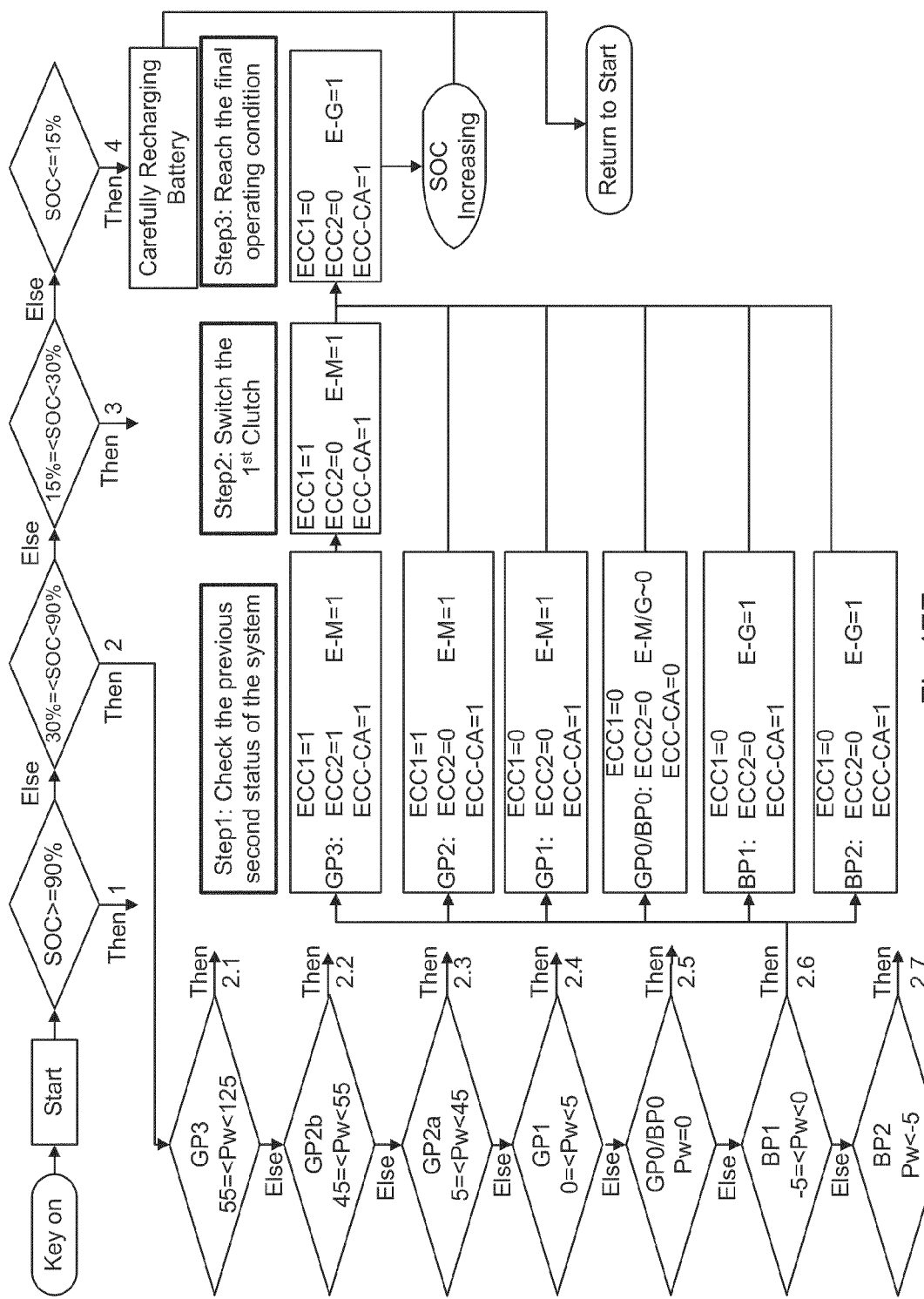
Figure 17G:
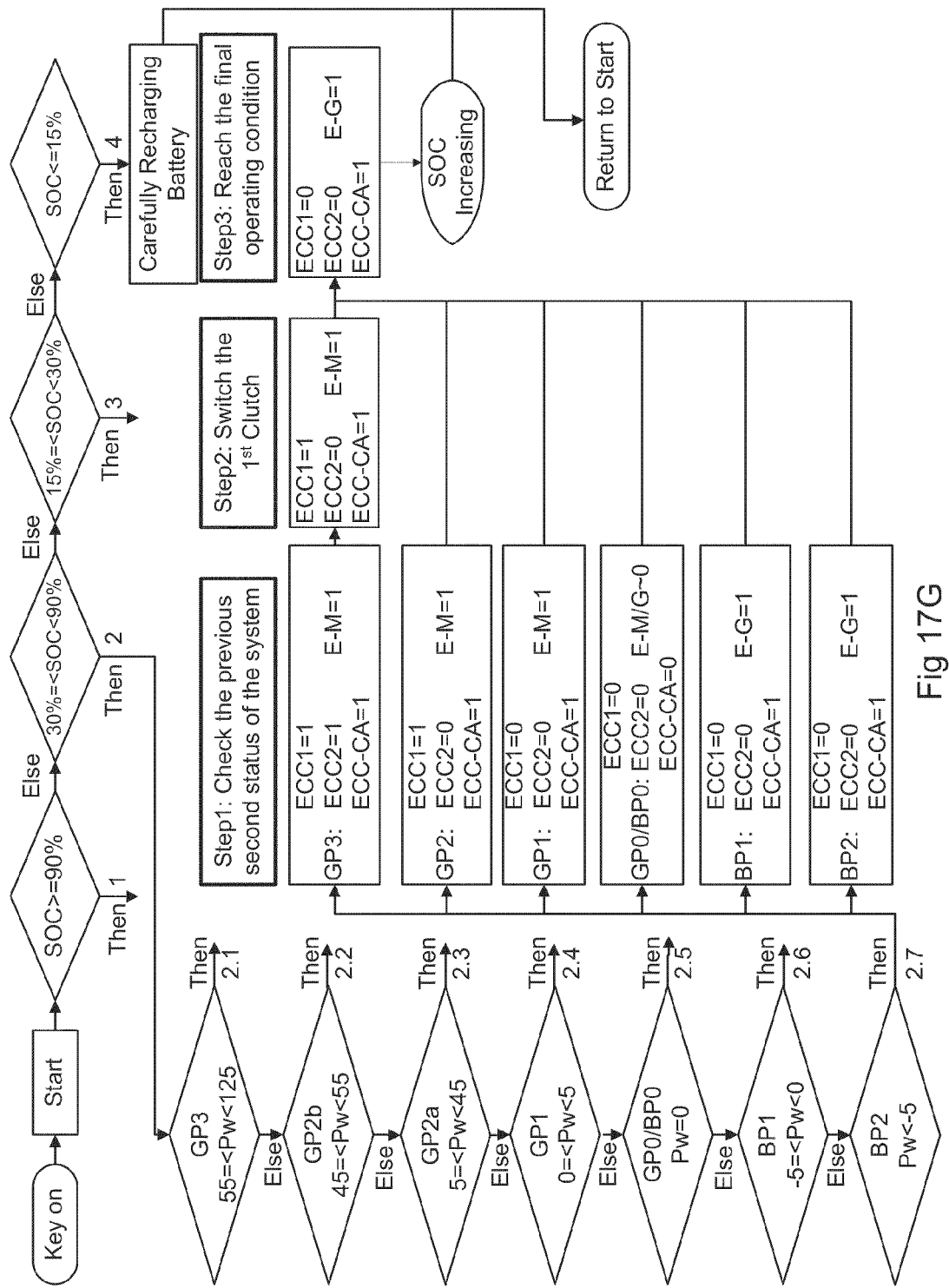
Figure 17H:
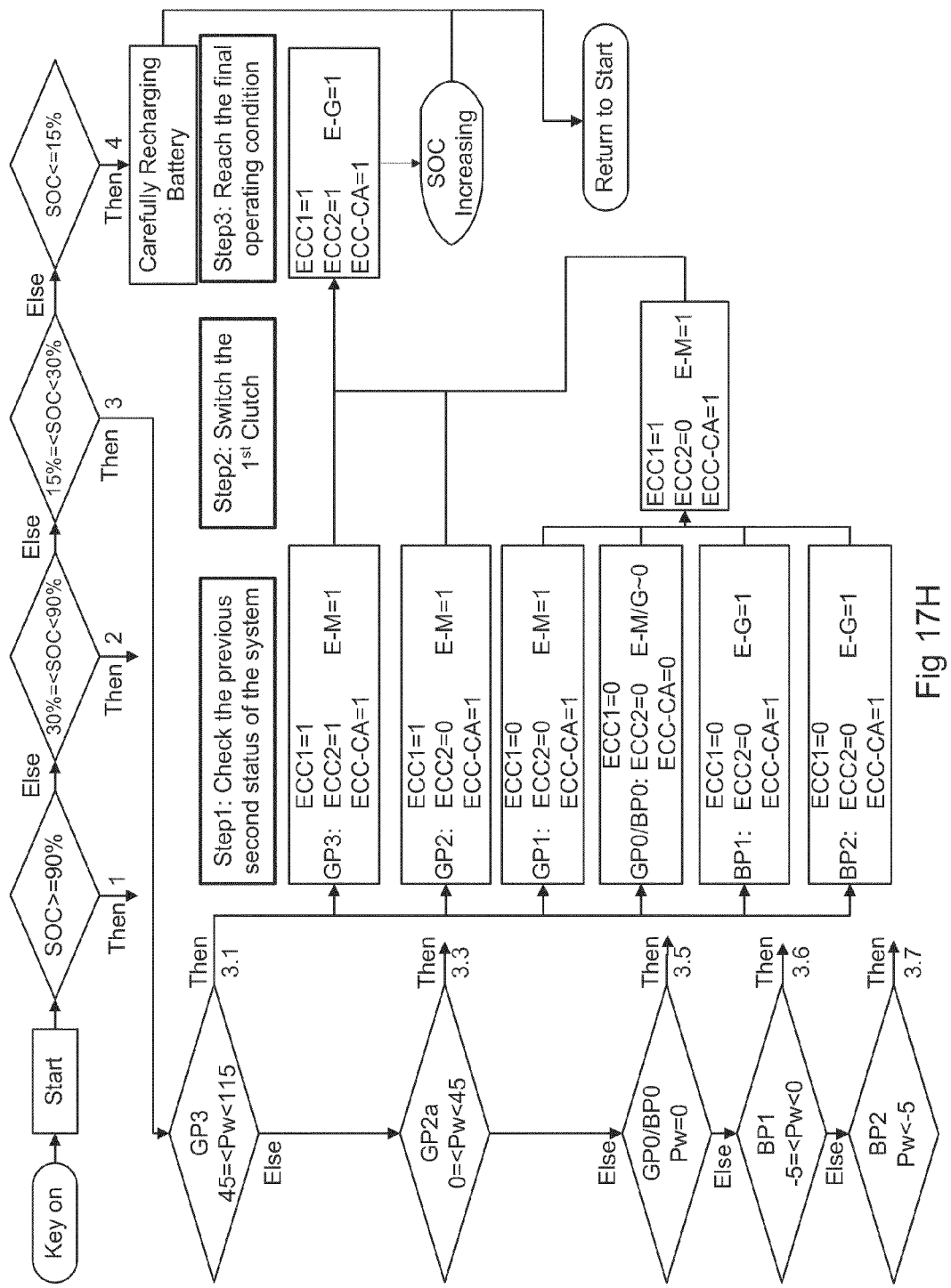
Figure 17I:
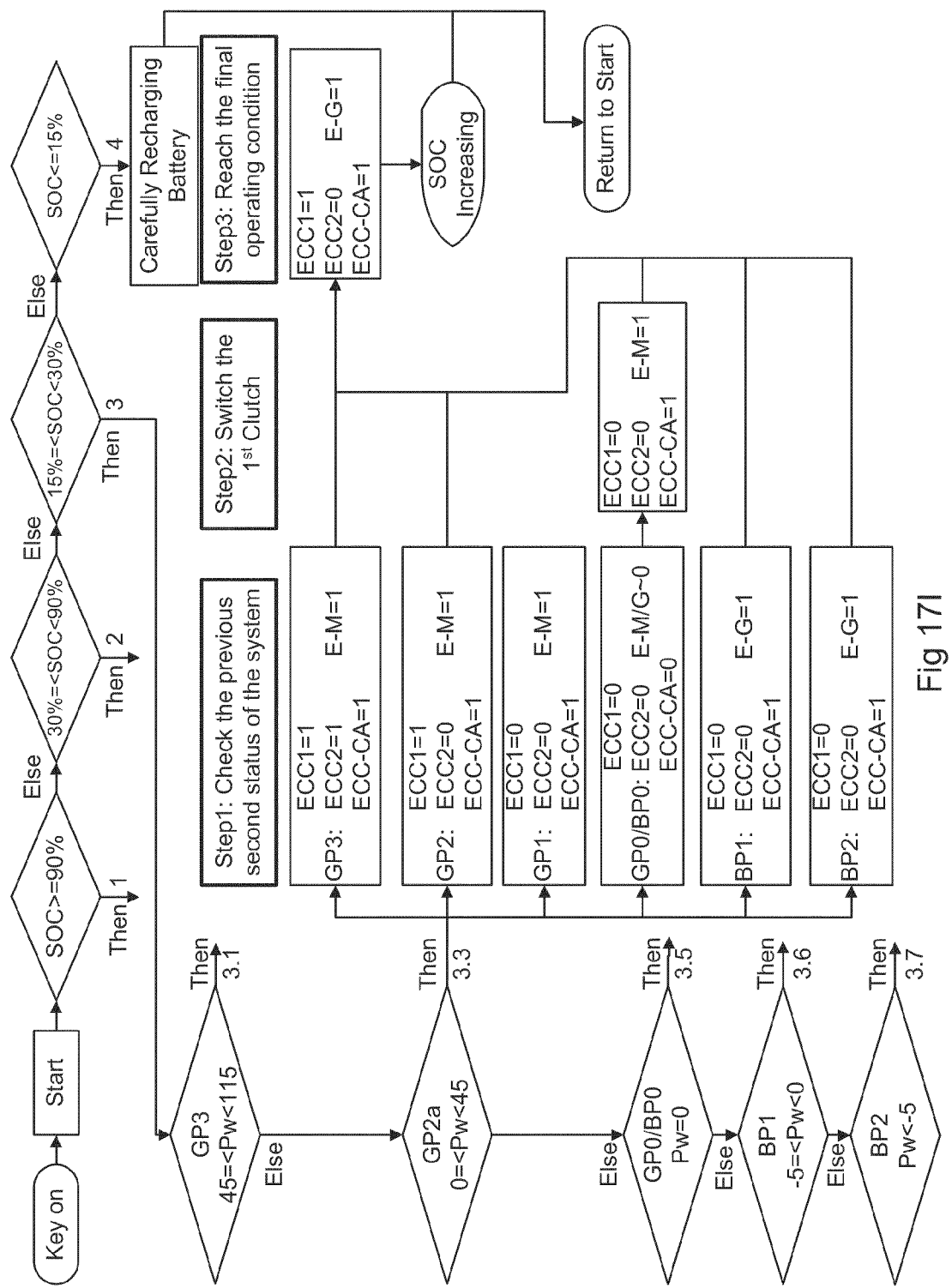
Figure 17J:
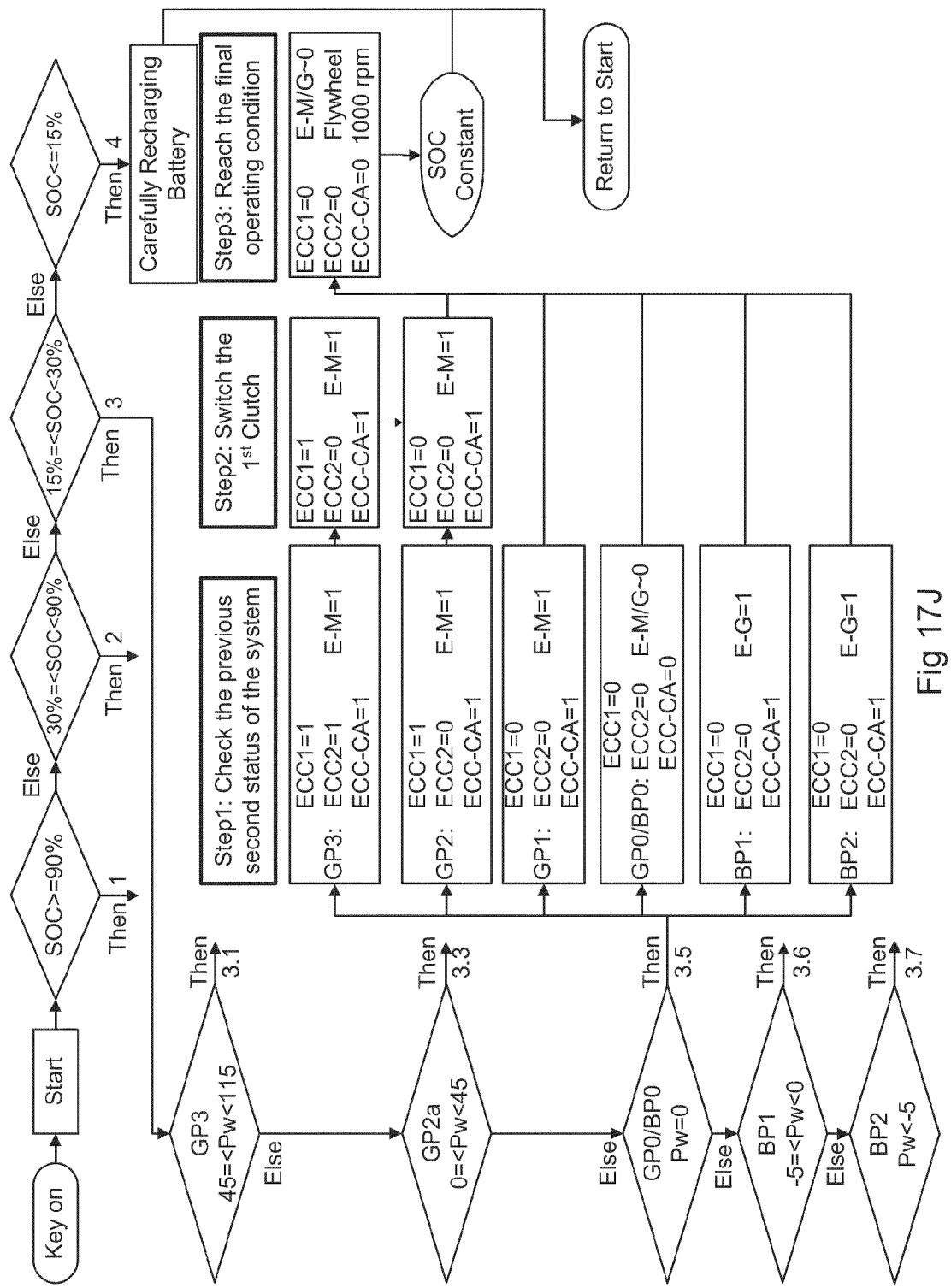
Figure 17K:
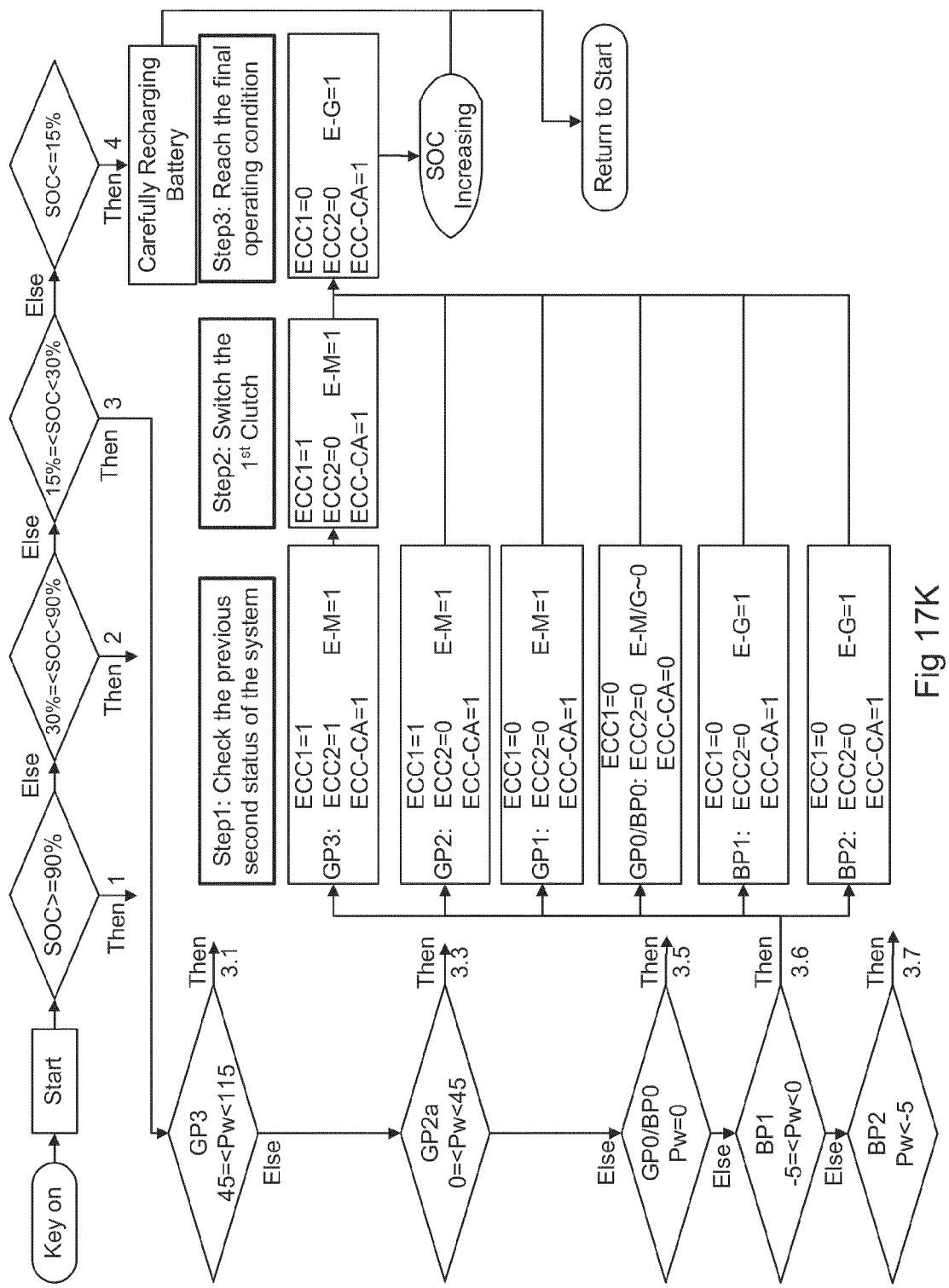
Figure 17L:
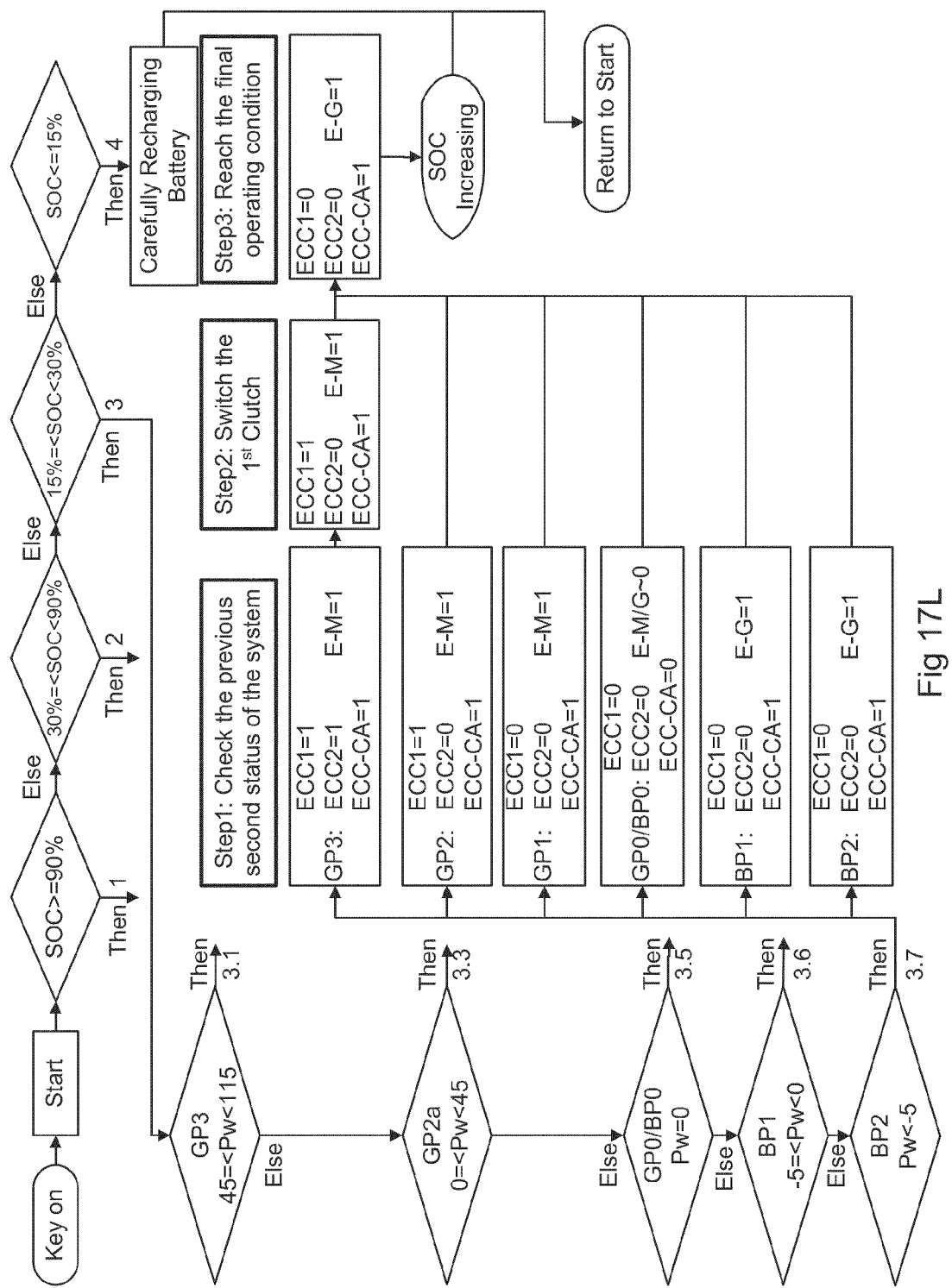

The plot in FIG. 14 illustrates the general scenario of activation of the inventive subject matter during vehicle coasting and braking. In this scenario example, the braking effort is divided into two ranges. As in the scenario above, when the vehicle is coasting and no brake pressure is applied to the brake pedal (BP0), both primary and secondary ICE modules are disengaged and stopped, the vehicle is coasting and coasting due to the mass inertia of the vehicle and either flywheel inertia or free-wheeling if a glide type transmission is employed. In the first low range (BP1) when relatively low force is applied to the brake pedal, only electric "regenerative" braking occurs, by using the E-M/G as a generator connected to recharge the battery. This regenerative braking is applied through the transmission drive train to slow the vehicle. When more immediate braking is sought by applying increased force to the brake pedal in the higher range (BP2), both mechanical/hydraulic brakes connected directly to the vehicle wheels and regenerative braking applied to the drive train are applied. Of course one could substitute other types of braking, such as electrically actuated brakes, for mechanical/hydraulic brakes as they become available and acceptable for general use and application. Other scenarios can use variations in the BP2 range when mechanical braking is used alone and regenerative braking is used to only charge the batteries.

Break points "A", "B" and "C" shown in the plots of FIGS. 13 and 14, are represented with double ended arrows to indicate that they may be programmed to be dependent on various parameters, such as but not limited to: external air temperature, mass air measurements, oxygen level, altitude, weight of load in vehicle, speed of vehicle, temperatures of engine modules, speeds of engine modules, speed of flywheel, temperature of flywheel, road conditions (uphill, downhill, flat, rough, smooth, etc.), fuel energy properties, driver selection of high fuel economy or performance, and battery charge.

FIGS. 15 and 16 provide two exemplary matrices indicating which of the variously controlled elements is engaged or disengaged in the system during certain conditions when the state of battery charge is at either maximum or minimum operational threshold levels. The FIG. 15 matrix provides the control scenario when the battery is near fully charged to at least 75% of its capacity. The FIG. 16 matrix provides the control scenario when the battery is charged to a level that is approximately 30% of its capacity or below. The main difference in the two scenarios is that when the battery charge is low, the flywheel is spun up during a pre-engine start by the E-M/G; and during the following start phase, the primary engine module OPOC1 is started and remains on until conditions, such as increased battery charge and low acceleration demand, allow it to be turned off. There is room for design variation that is associated with the break points "A", "B" and "C", described in the preceding paragraph with respect to FIGS. 13 and 14, when the battery is charged at levels between those 30% and 75% thresholds selected in these matrices.

For a better understanding of the flow chart, the codes used therein are defined as follows:

TABLE A

| | |
|---|---|
| Primary $opoc_e$ <= | 50 kW |
| Secondary $opoc_p$ <= | 70 kW |
| Efficiency of E-M | 90% |
| $E\text{-}M_{electric\text{-}in}$ <= | 5.56 kW |
| $E\text{-}M_{mechanic\text{-}out}$ <= | 5 kW |

TABLE A-continued

| | |
|---|---|
| Efficiency of E-G | 70% |
| $E\text{-}G_{mechanic\text{-}in}$ <= | −5 kW |
| $E\text{-}G_{electric\text{-}out}$ <= | −3.5 kW |

TABLE B

GP3: Pw = $opoc_e$ + $opoc_p$ + $E\text{-}M_{mechanic\text{-}out}$ (or $E\text{-}G_{mechanic\text{-}in}$)
GP2b: Pw = $opoc_e$ + $E\text{-}M_{mechanic\text{-}out}$
GP2a: Pw = $opoc_e$ + $E\text{-}G_{mechanic\text{-}in}$
GP1: Pw = $E\text{-}M_{mechanic\text{-}out}$
BP1: Pw = $E\text{-}G_{mechanic\text{-}in}$
BP2: Pw = $E\text{-}G_{mechanic\text{-}in}$ + Mech. Brake

TABLE C

ECC1: Signal to Cutch between $opoc_e$ and flywheel [E-M/G]
ECC2: Signal to Cutch between $opoc_p$ and flywheel [E-M/G]
ECC-CA: Signal to Cutch between Transmission and flywheel
E-M/G: Motor/Generator
E-M: E-Motor
E-G: Generator
Engaged/Closed = 1
Disengaged/Open = 0

TABLE D

| | |
|---|---|
| Start/Restart: | $n_{Start}$ = 1,000 rpm |
| GP2/GP3 Inertia Start with $n_{Start}$ if SOC <20% | |
| GP0/BP0 -> E-M keeps Flywheel at $n_{Start}$ rpm | |

With the ignition switch "Key" turned on, the procedure in FIG. 17 enters the Start routine to determine which couplings should be engaged based on the state of charge "SOC" of the battery. Other factors such as temperature or the engine coolant and ambient air, for instance, could be used as additional factors. However, for this example, only State of Charge is being considered. This is a reiterative routine and is repeated at a predetermined cycle rate throughout the time the system is in operation and is not restricted to initial start up.

To begin, the SOC is determined. In this example, four threshold levels are used to determine whether the couplings will be engaged to either engage the E-M/G as a motor to provide power and allow the SOC to be in a "reducing" state; to disengage the E-M/G and allow the SOC to remain "constant"; or to configure the E-M/G as a generator E-G and cause the SOC to be "increasing". In the most severe condition, when the SOC is determined to be at or below 15%, the system enters a "carefully recharging" mode in which slow charging of the batteries takes place. The carefully charging mode is normally considered to be a constant current and constant voltage but at a current rate that is 1× the capacity of the battery at its amp/hr rating The SOC determination is the first filter in the process. Secondly, the defined power demand is determined based on the Gas pedal (GP) and Brake pedal (BP) positions. (In this flow chart, the settings for Gas pedal and Brake pedal positions are different than those exemplified in FIG. 13.) Here, the ranges GP3, GOP2b, GP2a. GP1, GP0/BP0, BP1 and BP2 are expressed as power ranges that are achieved when the modules as set forth in Table B are coupled together. It can be seen from the flow chart in FIG. 17 that after it is determined that the SOC is high, greater than 90%, the ranges of definition for the various switch points are broader in range than they are when it is determined that the SOC is in the mid-range between 30% and 90%. This is because when the SOC is high, there is no need to charge the battery. But in the mid range, there may be a need to charge, except when the demands on the system are high (GP3 and GP2b). In each case of filtering process first looks for the highest demand and works its way down towards the minimal demands. After the second filter, determination is made as to which couplings are energized and therefore which power modules are activated to power the vehicle.

FIGS. 17A-17L constitute a single detailed flow chart that provides enhanced control of the system based not only on the SOC, but also on the coupling settings as they existed after the last iteration of the program. As can be seen in FIGS. 17A-17L the first filtering takes place along the upper horizontal line where SOC is determined. To get sense of how the individual sheets of drawings are laid out, each SOC filtering determination, such as that made where the SOC is determined to be equal to or greater than 90%, is followed by the second filtering determinations. For 30%≦SOC<90%, filtering is covered in FIGS. 17A-17G. For 15%<SOC≦30%, filtering is covered in FIGS. 17H-17L.

In FIGS. 17A-17L, for each SOC filtering determination there is a second filtering step that looks at the present position of the Gas pedal and the Brake pedal to determine the presently desired power setting. After the second filtering, there is a third filtering (labeled "Step 1") that determines what the immediately prior coupling settings were during the last iteration of the program. Based upon the "Step 1" determination, another determination may be made in "Step 2" as to whether or not to change the setting of any of the couplings that engage the primary engine, the secondary engine or the E/M to the system. Following "Step 2", a final setting is made in "Step 3" for the present iteration of the program with the codes as stated in Table D.

As can be seen by the drawings and accompanying explanation, the present invention is a unique improvement over conventional hybrid engine systems. And while the embodiments shown here are preferred, depending on the engineering applications and requirements, they shall not be considered to be a restriction on the scope of the claims set forth below.

I claim:

1. A system for power transfer, comprising:
   a primary internal combustion engine;
   a secondary internal combustion engine;
   a flywheel;
   a first clutch having first and second portions; and
   a second clutch having first and second portions wherein:
   the first and second clutches each have an engaged position in which the first and second portions of the clutch rotate together and a disengaged position in which the first portion of the clutch rotates independently of the second portion of the clutch;
   axes of rotation of the primary engine, the secondary engine, the flywheel, the first clutch, and the second clutch are substantially collinear;
   the first portion of the first clutch is coupled to the primary engine such that the first portion of the first clutch and the primary engine rotate together;
   the second portion of the first clutch is coupled to the flywheel such that the second portion of the first clutch and the flywheel rotate together;
   the second clutch is disposed between the primary and secondary engines;
   the first portion of the second clutch is coupled to the secondary engine such that the first portion of the second clutch and the secondary engine rotate together; and
   the second portion of the second clutch is coupled to the primary engine such that the second portion of the second clutch and the primary engine rotate together.

2. The system of claim 1, further comprising:
   permanent magnets affixed to a surface of the flywheel; and
   a stator having coils located proximate the permanent magnets and separated from the permanent magnets by a gap.

3. The system of claim 2, further comprising:
   a controller coupled to the coils wherein the flywheel is capable of operating as a kinetic storage device, a motor, and a generator depending on the current in the coils.

4. The system of claim 1, further comprising:
   a third clutch having an axis of rotation collinear with axes of rotation of the first and second clutches, the third clutch having a first portion coupled to the flywheel and a second portion coupled to a power takeoff and the third clutch selectably engages the flywheel with the power takeoff.

5. The system of claim 4, further comprising:
   a transmission coupled to the power takeoff wherein an axis of rotation of the transmission is offset from the axis of rotation of the power takeoff.

6. The system of claim 1 wherein: the flywheel is disposed on a side of the primary engine distal from the secondary engine.

7. The system of claim 1, further comprising:
   permanent magnets affixed to a surface of the flywheel;
   a stator having coils located proximate the permanent magnets and separated from the permanent magnets by a gap; and
   a controller electronically coupled to:
   the coils to control current through the coils so that the flywheel acts as one of a motor and a generator;
   the first clutch to command engagement and disengagement of the first clutch; and
   the second clutch to command engagement and disengagement of the second clutch.

8. The system of claim 7 wherein, upon receiving a starting request:
   the controller commands the flywheel to rotate by commanding the flywheel to act as a motor and controlling the current in the coils;
   the controller commands the first clutch to engage when the flywheel is rotating at a speed greater than a first threshold speed; and
   the controller commands the primary engine to start when the engine is rotating at a speed greater than a second threshold speed.

9. The system of claim 8, wherein:
   the controller commands one of the primary and secondary engines to operate and commands the other of the primary and secondary engines to be deactivated when demanded power from the system is in a first range;
   the controller commands both the primary and secondary engines to operate when demanded power from the system is in a second range; and
   the controller bases a transition from the first range and the second range at least on minimizing overall brake specific fuel consumption (bsfc) of the primary and secondary engines.

10. The system of claim 4, further comprising:
    a transmission; and
    a third clutch selectably coupling the transmission and the flywheel.

11. A coupling system for power transfer, comprising:
    a first internal combustion engine;

a second internal combustion engine;
a motor-generator;
a first coupler selectably coupling the first engine with the second engine; and
a second coupler selectably coupling the second engine with the motor generator wherein axes of rotation of the first engine, the second engine, the motor-generator the first coupler, and the second coupler are substantially coincident; and when both of the first and second couplers are engaged, the first engine, the second engine, the motor-generator, the first coupler, and the second coupler rotate synchronously;
a third coupler; and
a power takeoff selectably coupable to the motor-generator via the third coupler.

12. The system of claim 11 wherein the first and second couplers are clutches and the first and second couplers are one of electronically and hydraulically actuated.

13. The system of claim 11 wherein the motor-generator further comprises a kinetic energy storage device.

14. The system of claim 11 wherein the first engine comprises a first opposed-piston, opposed-cylinder engine and the second engine comprises a second opposed-piston, opposed-cylinder engine.

15. The system of claim 11 wherein the first, second, and third couplers comprise electronically-controlled clutches.

16. The system of claim 15, further comprising:
a transmission having an axis of rotation displaced from the axis of rotation of the power takeoff; and
an element coupling the transmission with the power takeoff wherein the element is one of a belt, a chain, and a gear.

17. A system for power transfer, comprising:
a primary internal combustion engine;
a secondary internal combustion engine;
a motor-generator; and
a first clutch;
a second clutch wherein:
axes of rotation of the primary engine, the secondary engine, the motor-generator, the first clutch, and the second clutch are substantially collinear;
the first clutch is disposed between the primary engine and the motor-generator;
a first portion of the first clutch is coupled to the primary engine such that the first portion of the first clutch and the primary engine rotate together;
a second portion of the first clutch is coupled to the motor-generator such that the second portion of the first clutch and the motor-generator rotate together;
the second clutch is disposed between the primary and secondary engines;
a first portion of the second clutch is coupled to the secondary engine such that the first portion of the second clutch and the secondary engine rotate together;
the first and second clutches have an engaged position in which the first and second portions of the clutch rotate together and a disengaged position in which the first portion of the clutch rotates independently of the second portion of the clutch;
when the motor-generator is operated as a motor and the first clutch is engaged, the primary engine is caused to rotate; and
when the second clutch is engaged, the primary and secondary engines rotate synchronously.

18. The system of claim 17, further comprising:
a transmission; and
a third clutch selectably coupling the transmission and the flywheel.

19. The system of claim 17 wherein the motor-generator comprises a flywheel with magnets affixed to the flywheel and coils of a stator separated from the magnets by a gap.

20. The system of claim 17, further comprising:
a controller electronically coupled to the first and second clutches and the motor-generator, wherein upon receiving a starting request:
the controller commands the motor-generator to rotate;
the controller commands the first clutch to engage when the motor-generator is rotating at a speed greater than a first threshold speed; and
the controller commands the primary engine to start when the primary engine is rotating at a speed greater than a second threshold speed.

21. The system of claim 18, further comprising:
a controller electronically coupled to the first and second clutches, the motor-generator, and the third clutch.

\* \* \* \* \*